(12) United States Patent
Yamamoto et al.

(10) Patent No.: US 6,720,971 B1
(45) Date of Patent: Apr. 13, 2004

(54) IMAGE PROCESSING METHOD AND APPARATUS, AND STORAGE MEDIUM

(75) Inventors: Kunihiro Yamamoto, Yokohama (JP); Kentaro Matsumoto, Higashikurume (JP); Yasuo Fukuda, Yokohama (JP); Kiyoshi Kusama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/320,570

(22) Filed: May 27, 1999

(30) Foreign Application Priority Data

| May 29, 1998 | (JP) | .......................................... | 10-150009 |
| May 29, 1998 | (JP) | .......................................... | 10-150224 |
| May 29, 1998 | (JP) | .......................................... | 10-150225 |
| May 29, 1998 | (JP) | .......................................... | 10-150228 |

(51) Int. Cl.⁷ ................................................. G09G 5/00
(52) U.S. Cl. ........................ 345/581; 345/588; 345/589; 345/600; 345/629
(58) Field of Search ................................ 345/581, 589, 345/629, 588, 600

(56) References Cited

U.S. PATENT DOCUMENTS

| 4,979,031 | A | * | 12/1990 | Tsuboi et al. ................ | 358/538 |
| 5,473,740 | A | * | 12/1995 | Kasson ........................ | 345/628 |
| 5,809,366 | A | * | 9/1998 | Yamakawa et al. ........... | 399/39 |
| 6,157,747 | A | * | 12/2000 | Szeliski et al. .............. | 382/284 |
| 2002/0044691 | A1 | * | 4/2002 | Matsugu ...................... | 382/218 |

FOREIGN PATENT DOCUMENTS

| CA | 2187267 | | 4/1998 | .......... H04N/5/272 |
| EP | 0824246 | A | 2/1998 | .............. G06T/7/00 |
| EP | 0829378 | A | 3/1998 | .............. B44C/1/28 |
| EP | 0852363 | A2 | 7/1998 | ........... G06T/11/00 |

OTHER PUBLICATIONS

"Image Mosaics" Lecture Notes In Computer Science, A. Finkelstein et al., U.S., Springer Verlag, NY, NY, No. 1375, Mar. 1998, pp. 11–22, XP00085:2871, ISSN:0302–9743.

"Computer–produced grey scales", K. Knowlton et al., Visible Language, Spring 1977, USA, vol. 11, No. 2, pp. 38–49, XP000972257, ISSN:0022–2224.

* cited by examiner

Primary Examiner—Matthew C. Bella
Assistant Examiner—Mike Rahmjoo
(74) Attorney, Agent, or Firm—Fitzpatrick, Cella, Harper & Scinto

(57) ABSTRACT

There are provided an image processing method and apparatus for generating a mosaic image by combining a plurality of material images in a mosaic pattern. The number of material images is increased on the basis of a plurality of stored material images, material images added by capturing a moving image, or the like, and a mosaic image with higher image quality is generated based on such material images.

15 Claims, 21 Drawing Sheets

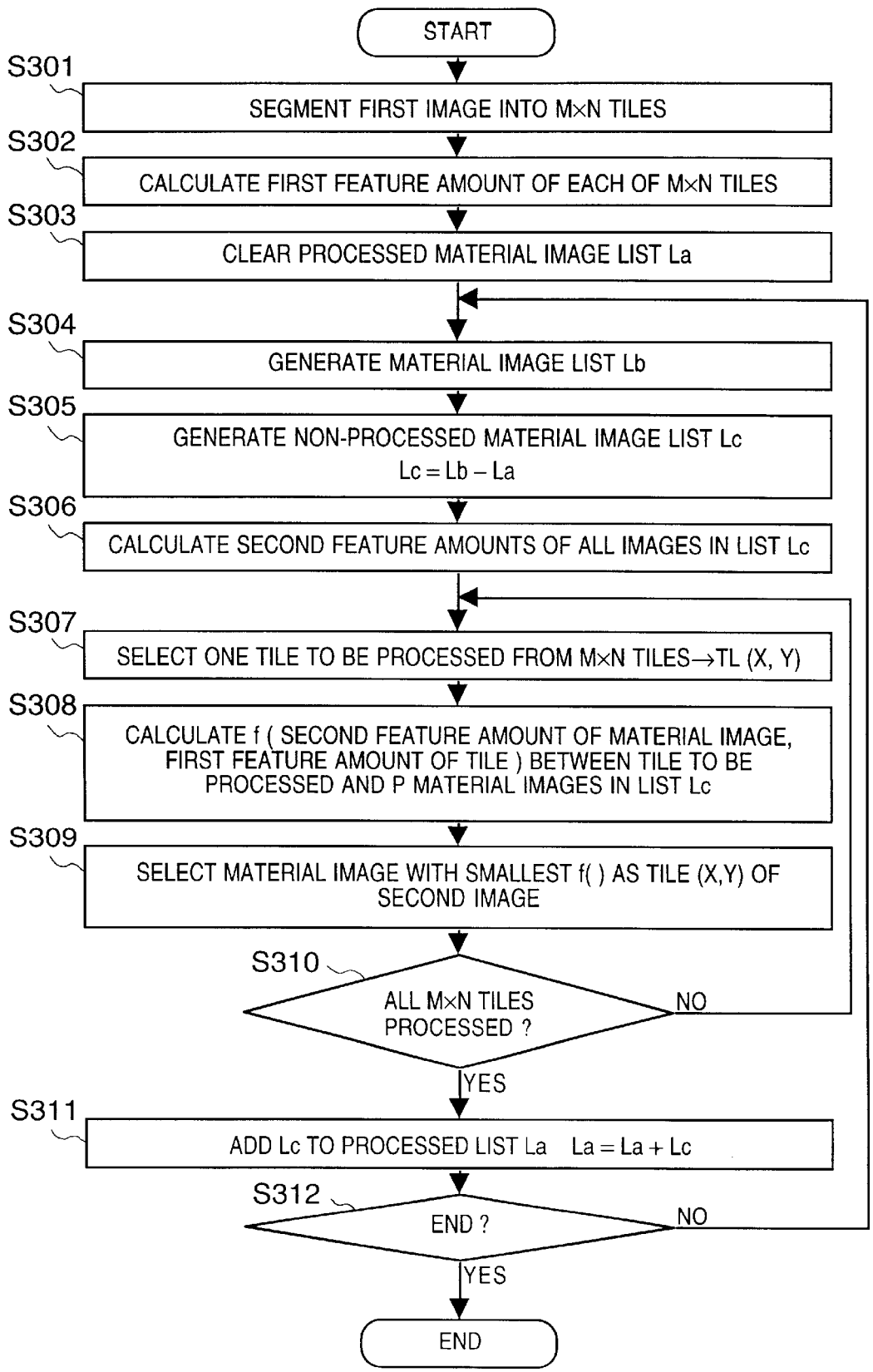

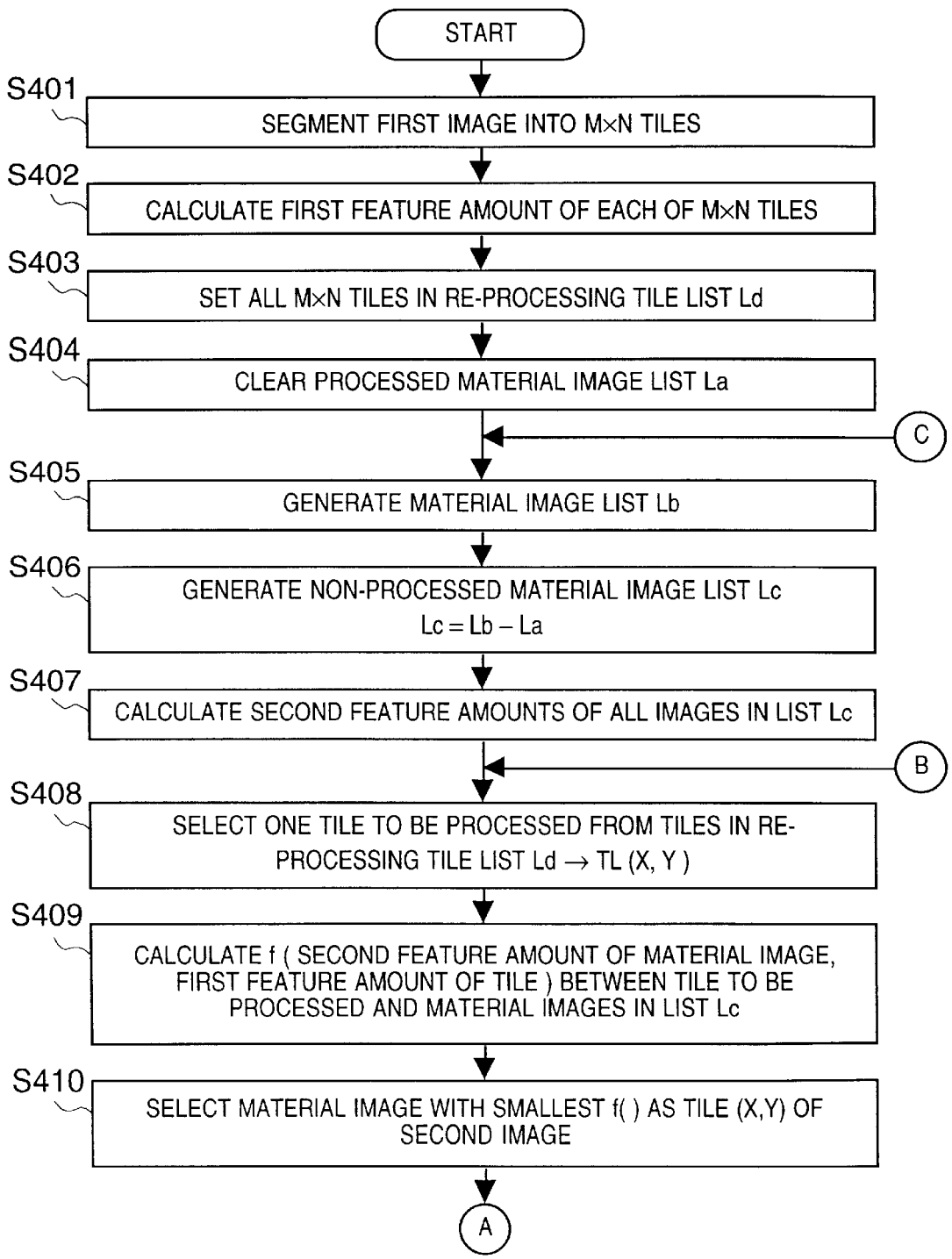

FIG. 17
ORIGINAL TILE
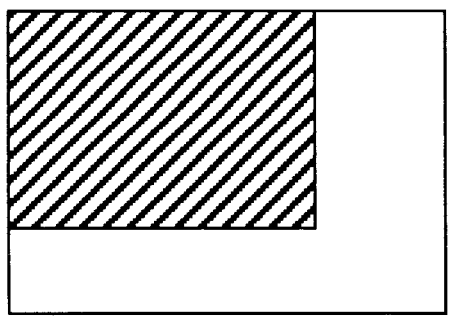
TEMPLATE 1
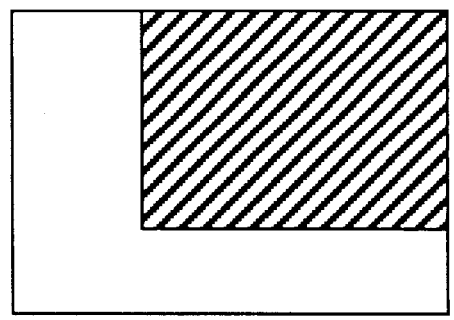
TEMPLATE 2
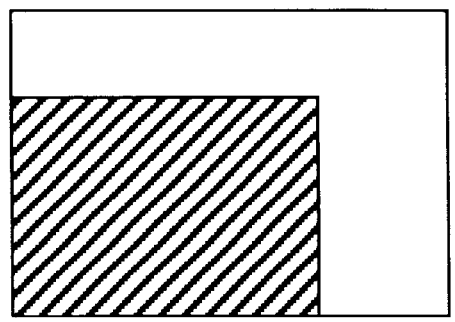
TEMPLATE 3
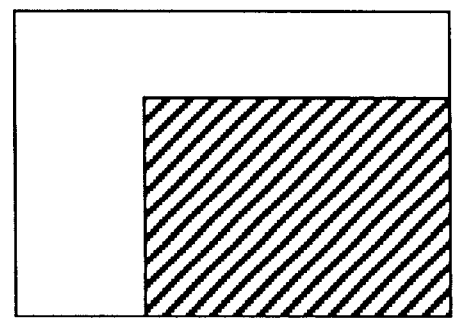
TEMPLATE 4

FIG. 19

| ORIGINAL TILE IMAGE ID | FEATURE AMOUNT OF DERIVATIVE TILE IMAGE ||||
| --- | --- | --- | --- | --- |
| | TEMPLATE 1 | TEMPLATE 2 | TEMPLATE 3 | TEMPLATE 4 |
| 0 0 1 | a a a | b b b | c c c | d d d |
| 0 0 2 | w w w | x x x | y y y | z z z |
| 0 0 3 | . . | . . | . . | . . |
| . . | . . | . . | . . | . . |

IMAGE PROCESSING METHOD AND APPARATUS, AND STORAGE MEDIUM

BACKGROUND OF THE INVENTION

The present invention relates to an image processing method and apparatus for generating a mosaic image by combining a plurality of material images in a mosaic pattern, and a storage medium which stores a program for making a computer implementation of the method.

As is well known, mosaic is "a design made by inlaying a combination of small pieces of various colors of stone, glass, marble, and the like into a floor, wall, or the like, or a technique of obtaining such design" (Gendai Kokugo Jiten, Sanseido). Using this technique, a design or a picture image can be formed by combining a large number of picture images.

However, upon generating such mosaic image, when the number of material images (tile images) that form the mosaic image is small, the quality of the mosaic image using those material images deteriorates since the color and texture become different from those of an original image. For this reason, an image database that stores a larger number of material images is preferably prepared. However, in order to store many material images, a large-size storage is required. However, it is not practical since it results in an increase in cost.

Even when a large number of material images are prepared, if their colors are offset to specific colors, the generated image has a color different from that of an original image.

SUMMARY OF THE INVENTION

The present invention has been made in consideration of the aforementioned prior art, and has as its object to provide an image processing method and apparatus, which can generate a visually natural mosaic image by increasing the number of material images that form a mosaic image so as to improve the quality of the mosaic image generated using those images, and a storage medium.

It is another object of the present invention to provide an image processing method and apparatus, which generates many material images from a limited number of database material images, and generates a mosaic image using these material images.

It is still another object of the present invention to provide an image processing method and apparatus, which can reduce any color tone differences between an original image and mosaic image by executing color conversion to make colors of tile areas of the original image to be close to those of the material images.

It is still another object of the present invention to provide an image processing method and apparatus, which can reduce any color tone differences between an original image and mosaic image by executing color conversion to make colors of the material images to be close to those of tile areas of the original image.

The present invention presents its contents as a plurality of claims, each of which is made to achieve at least one of the above-mentioned objects.

More specifically, an image processing apparatus for generating a mosaic image by combining a plurality of material images in a mosaic pattern, comprises storage means for storing a plurality of material images, material image generation means for generating another material image on the basis of a material image stored in the storage means, and mosaic image generation means for generating a mosaic image using a plurality of material images generated by the material image generation means.

An image processing method for generating a mosaic image by combining a plurality of material images in a mosaic pattern, comprises the material image generation step of generating another material image on the basis of each of a plurality of stored material images, and the mosaic image generation step of generating a mosaic image using a plurality of material images generated in the material image generation step.

A computer-readable storage medium, which stores a program for implementing an image processing method for generating a mosaic image by combining a plurality of material images in a mosaic pattern, comprises a material image generation step module for generating another material image on the basis of each of a plurality of stored material images, and a mosaic image generation step module for generating a mosaic image using a plurality of material images generated in the material image generation step module.

An image processing method for generating a mosaic image by combining a plurality of material images in a mosaic pattern, comprises the step of adding a still image captured from a moving image at a predetermined timing to material images, and the mosaic image generation step of generating a mosaic image on the basis of the added material images.

An image processing method for generating a mosaic image by combining a plurality of material images in a mosaic pattern, comprises the material image addition step of adding a still image captured from a moving image at a predetermined timing to material images, the first feature amount calculation step of calculating a first feature amount in units of segmented images of an original image, the second feature amount calculation step of calculating a second feature amount of the added material image, the material selection evaluation step of calculating a material selection evaluation value using the first feature amount in units of segmented images and the second feature amount of the material image, and the optimal image selection step of selecting an optimal image on the basis of the material selection evaluation value.

An image processing method for generating a mosaic image by combining a plurality of material images in a mosaic pattern, comprises the step of calculating first average luminance values of red, green, and blue tristimulus value components in units of segmented images of an original image, the step of calculating second average luminance values of red, green, and blue tristimulus value components of a plurality of material images, the material selection evaluation step of calculating a material selection evaluation value on the basis of the first and second average luminance values, and the optimal image selection step of selecting an optimal material image on the basis of the material selection evaluation value.

A computer-readable storage medium, which stores a program for implementing an image processing method for generating a mosaic image by combining a plurality of material images in a mosaic pattern, comprises a step module for adding a still image captured from a moving image at a predetermined timing to material images, and a mosaic image generation step module for generating a mosaic image on the basis of the added material images.

A computer-readable storage medium, which stores a program for implementing an image processing method for generating a mosaic image by combining a plurality of material images in a mosaic pattern, comprises a material image addition step module for adding a still image captured from a moving image at a predetermined timing to material images, a first feature amount calculation step module for calculating a first feature amount in units of segmented images of an original image, a second feature amount calculation step module for calculating a second feature amount of the added material image, a material selection evaluation step module for calculating a material selection evaluation value using the first feature amount in units of segmented images and the second feature amount of the material image, and an optimal image selection step module for selecting an optimal image on the basis of the material selection evaluation value.

A computer-readable storage medium, which stores a program for implementing an image processing method for generating a mosaic image by combining a plurality of material images in a mosaic pattern, comprises a step module for calculating first average luminance values of red, green, and blue tristimulus value components in units of segmented images of an original image, a step module for calculating second average luminance values of red, green, and blue tristimulus value components of a plurality of material images, a material selection evaluation step module for calculating a material selection evaluation value on the basis of the first and second average luminance values, and an optimal image selection step module for selecting an optimal material image on the basis of the material selection evaluation value.

An image processing apparatus for generating a mosaic image by combining a plurality of material images in a mosaic pattern, comprises arithmetic means for segmenting an original image into a plurality of areas, and calculating a first color distribution parameter on the basis of an average pixel value of each of the plurality of areas, calculation means for calculating a second color distribution parameter on the basis of an average pixel value of each of a plurality of material images, color conversion parameter calculation means for calculating a color conversion parameter for changing colors of the respective areas on the basis of the first and second color distribution parameters, color conversion means for converting the colors of the respective areas using the color conversion parameter calculated by the color conversion parameter calculation means, and mosaic image generation means for generating a mosaic image by selecting a material image corresponding to each area converted by the color conversion means.

An image processing apparatus comprises generation means for generating a plurality of derivative material images from each of a plurality of material images prepared in advance, segmentation means for segmenting an image to be processed into a plurality of blocks to obtain a plurality of block images, and replacement means for replacing each of the plurality of block images by the derivative material image on the basis of a feature amount of each of the plurality of block images and a feature amount of the derivative image generated by the generation means.

An image processing method comprises the generation step of generating a plurality of derivative material images from each of a plurality of material images prepared in advance, the segmentation step of segmenting an image to be processed into a plurality of blocks to obtain a plurality of block images, and the replacement step of replacing each of the plurality of block images by the derivative material image on the basis of a feature amount of each of the plurality of block images and a feature amount of the derivative image generated in the generation step.

A computer-readable storage medium, which stores a control program for making a computer implement image processing for generating a mosaic image, the control program comprises a generation step module for generating a plurality of derivative material images from each of a plurality of material images prepared in advance, a segmentation step module for segmenting an image to be processed into a plurality of blocks to obtain a plurality of block images, and a replacement step module for replacing each of the plurality of block images by the derivative material image on the basis of a feature amount of each of the plurality of block images and a feature amount of the derivative image generated by the generation step module.

According to a preferred aspect of the present invention, in the image processing apparatus, the material image generation means generates a material image by horizontally flipping a first material image.

According to a preferred aspect of the present invention, in the image processing apparatus, the material image generation means generates a material image having pixels obtained by converting color values of pixels of a first material image.

According to a preferred aspect of the present invention, in the image processing apparatus, the material image generation means generates a material image by negative/positive-converting a first material image.

According to a preferred aspect of the present invention, in the image processing apparatus, the material image generation means generates a material image having pixels obtained by converting specific color values of pixels of a first material image.

According to a preferred aspect of the present invention, in the image processing method, the material image generation step includes the step of generating a material image by horizontally flipping a first material image.

According to a preferred aspect of the present invention, in the image processing method, the material image generation step includes the step of generating a material image having pixels obtained by converting color values of pixels of a first material image.

According to a preferred aspect of the present invention, in the image processing method, the material image generation step includes the step of generating a material image by negative/positive-converting a first material image.

According to a preferred aspect of the present invention, in the image processing method, the material image generation step includes the step of generating a material image having pixels obtained by converting specific color values of pixels of a first material image.

According to a preferred aspect of the present invention, in the storage medium, the material image generation step module generates a material image by horizontally flipping a first material image.

According to a preferred aspect of the present invention, in the storage medium, the material image generation step module generates a material image having pixels obtained by converting color values of pixels of a first material image.

According to a preferred aspect of the present invention, in the storage medium, the material image generation step module generates a material image by negative/positive-converting a first material image.

According to a preferred aspect of the present invention, in the storage medium, the material image generation step module generates a material image having pixels obtained by converting specific color values of pixels of a first material image.

According to a preferred aspect of the present invention, the image processing method further comprises the non-processed material image list generation step of generating a non-processed material image list used for identifying material images which are newly added and are not used in a calculation of the material selection evaluation value from material images already used in the calculation of the material selection evaluation value, and the material selection evaluation value is calculated for only the unused material image.

According to a preferred aspect of the present invention, the image processing method further comprises the re-processing tile list generation step of generating a re-processing tile list for recording information that identifies if selection of the material image is unsettled, and the error reference discrimination step of discriminating a relationship between the calculated material selection evaluation value and a predetermined error reference value, and when the calculated material selection evaluation value is smaller than the predetermined error reference value, selection is settled as an optimal material image, and the material selection evaluation value is calculated for only areas where selection of the material image is unsettled.

According to a preferred aspect of the present invention, the image processing method further comprises the material image deletion step of deleting material image data which is not selected based on the material image selection evaluation value.

According to a preferred aspect of the present invention, in the image processing method, the optimal image selection step includes the step of selecting a material image which yields a minimum sum of squares of differences between the first and second feature amounts as an optimal material image.

According to a preferred aspect of the present invention, in the image processing method, the plurality of material images are added by capturing a moving image.

According to a preferred aspect of the present invention, in the image processing apparatus, the arithmetic means calculates the first color distribution parameter on the basis of R, G, and B values of pixels of each area.

According to a preferred aspect of the present invention, in the image processing apparatus, the calculation means calculates the second color distribution parameter on the basis of R, G, and B values of pixels of each material image.

According to a preferred aspect of the present invention, in the image processing apparatus, the arithmetic means calculates the first color distribution parameter on the basis of $a^*$ and $b^*$ values in an $L^*a^*b^*$ space of pixels of each area.

According to a preferred aspect of the present invention, in the image processing apparatus, the calculation means calculates the second color distribution parameter on the basis of $a^*$ and $b^*$ values in an $L^*a^*b^*$ space of pixels of each material image.

According to a preferred aspect of the present invention, in the image processing apparatus, the mosaic image generation means selects a material image which has a minimum distance between R, G, and B stimulus values of each area and R, G, and B stimulus values of each material image.

According to a preferred aspect of the present invention, in the image processing apparatus, the mosaic image generation means selects a material image which has a minimum distance between $a^*$ and $b^*$ values of each area and $a^*$ and $b^*$ values of each material image.

An image processing method for generating a mosaic image by combining a plurality of material images in a mosaic pattern, comprises the arithmetic step of segmenting an original image into a plurality of areas, and calculating a first color distribution parameter on the basis of an average pixel value of each of the plurality of areas, the calculation step of calculating a second color distribution parameter on the basis of an average pixel value of each of a plurality of material images, the color conversion parameter calculation step of calculating a color conversion parameter for changing colors of the respective areas on the basis of the first and second color distribution parameters, the color conversion step of converting the colors of the respective areas using the color conversion parameter calculated in the color conversion parameter calculation step, and the mosaic image generation step of generating a mosaic image by selecting a material image corresponding to each area converted in the color conversion step.

According to a preferred aspect of the present invention, in the image processing method, the arithmetic step includes the step of calculating the first color distribution parameter on the basis of R, G, and B values of pixels of each area.

According to a preferred aspect of the present invention, in the image processing method, the calculation step includes the step of calculating the second color distribution parameter on the basis of R, G, and B values of pixels of each material image.

According to a preferred aspect of the present invention, in the image processing method, the arithmetic step includes the step of calculating the first color distribution parameter on the basis of $a^*$ and $b^*$ values in an $L^*a^*b^*$ space of pixels of each area.

According to a preferred aspect of the present invention, in the image processing method, the calculation step includes the step of calculating the second color distribution parameter on the basis of $a^*$ and $b^*$ values in an $L^*a^*b^*$ space of pixels of each material image.

According to a preferred aspect of the present invention, in the image processing method, the mosaic image generation step includes the step of selecting a material image which has a minimum distance between R, G, and B stimulus values of each area and R, G, and B stimulus values of each material image.

According to a preferred aspect of the present invention, in the image processing method, the mosaic image generation step includes the step of selecting a material image which has a minimum distance between $a^*$ and $b^*$ values of each area and $a^*$ and $b^*$ values of each material image.

According to a preferred aspect of the present invention, in the image processing apparatus, the generation means generates the derivative material image by extracting a partial image from each of the plurality of material images.

According to a preferred aspect of the present invention, in the image processing apparatus, the generation means generates the derivative material images by extracting a plurality of partial images from each of the material images using a plurality of extraction templates.

According to a preferred aspect of the present invention, in the image processing apparatus, the replacement means replaces each of the plurality of block images by one of the derivative image and material image on the basis of the feature amount of each of the plurality of block images, and a feature amount of each of the plurality of derivative material images and the plurality of material images.

According to a preferred aspect of the present invention, the image processing apparatus further comprises enlargement/reduction means for executing enlargement/reduction to match image sizes of the derivative material image and material image with each other.

According to a preferred aspect of the present invention, in the image processing apparatus, the generation means comprises presentation means for presenting an extraction state of a derivative material image upon extracting the derivative material image from the material image, inquiry means for inquiring as to whether or not the extraction presented by the presentation means is to proceed, and deletion means for deleting the extracted derivative image when the inquiry means instructs that the extraction is not to proceed.

According to a preferred aspect of the present invention, in the image processing apparatus, the generation means recognizes an object in a partial image upon extracting the partial image from each of the plurality of material images, and extracts the partial image so as not to divide the recognized object.

According to a preferred aspect of the present invention, in the image processing apparatus, the generation means generates a table for storing feature amounts of the plurality of derivative material images obtained by extracting partial images from the plurality of material images prepared in advance in correspondence with derivation information that indicates a derivation method of the derivative material image, and the replacement means selects a derivative image used for each of the block images on the basis of the feature amount of each of the plurality of block images and the feature amount stored in the table, derives the selected derivative image on the basis of the derivation information stored in the table, and replaces each block image by the derived material image.

According to a preferred aspect of the present invention, in the image processing method, the generation step includes the step of generating the derivative material image by extracting a partial image from each of the plurality of material images.

According to a preferred aspect of the present invention, in the image processing method, the generation step includes the step of generating the derivative material images by extracting a plurality of partial images from each of the material images using a plurality of extraction templates.

According to a preferred aspect of the present invention, in the image processing method, the replacement step includes the step of replacing each of the plurality of block images by one of the derivative image and material image on the basis of the feature amount of each of the plurality of block images, and a feature amount of each of the plurality of derivative material images and the plurality of material images.

According to a preferred aspect of the present invention, the image processing method further comprises the enlargement/reduction step of executing enlargement/reduction to match image sizes of the derivative material image and material image with each other.

According to a preferred aspect of the present invention, in the image processing method, the generation step comprises the presentation step of presenting an extraction state of a derivative material image upon extracting the derivative material image from the material image, the inquiry step of inquiring as to whether or not the extraction presented in the presentation step is to proceed, and the deletion step of deleting the extracted derivative image when it is instructed in the inquiry step that the extraction is not to proceed.

According to a preferred aspect of the present invention, in the image processing method, the generation step includes the step of recognizing an object in a partial image upon extracting the partial image from each of the plurality of material images, and extracting the partial image so as not to divide the recognized object.

According to a preferred aspect of the present invention, in the image processing method, the generation step includes the step of generating a table for storing feature amounts of the plurality of derivative material images obtained by extracting partial images from the plurality of material images prepared in advance in correspondence with derivation information that indicates a derivation method of the derivative material image, and the replacement step includes the step of selecting a derivative image used for each of the block images on the basis of the feature amount of each of the plurality of block images and the feature amount stored in the table, deriving the selected derivative image on the basis of the derivation information stored in the table, and replacing each block image by the derived material image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a flow chart for explaining the sequence of the method for forming a mosaic image according to the fifth embodiment of the present invention;

FIGS. 15A and 15B is a flow chart for explaining the sequence of the method for forming a mosaic image according to the sixth embodiment of the present invention;

FIG. 17 shows image extraction templates used in a material image number increase process in the seventh embodiment of the present invention;

FIG. 19 is a table for explaining the data holding format that pertains to a tile image group T' in the 12th embodiment of the present invention.

DETAILED DESCRIPTION OF THE INVENTION

Preferred embodiments of the present invention will be described in detail in accordance with the accompanying drawings.

First Embodiment

The preferred embodiment of the present invention will now be described in detail with reference to the accompanying drawings.

Figure 1:
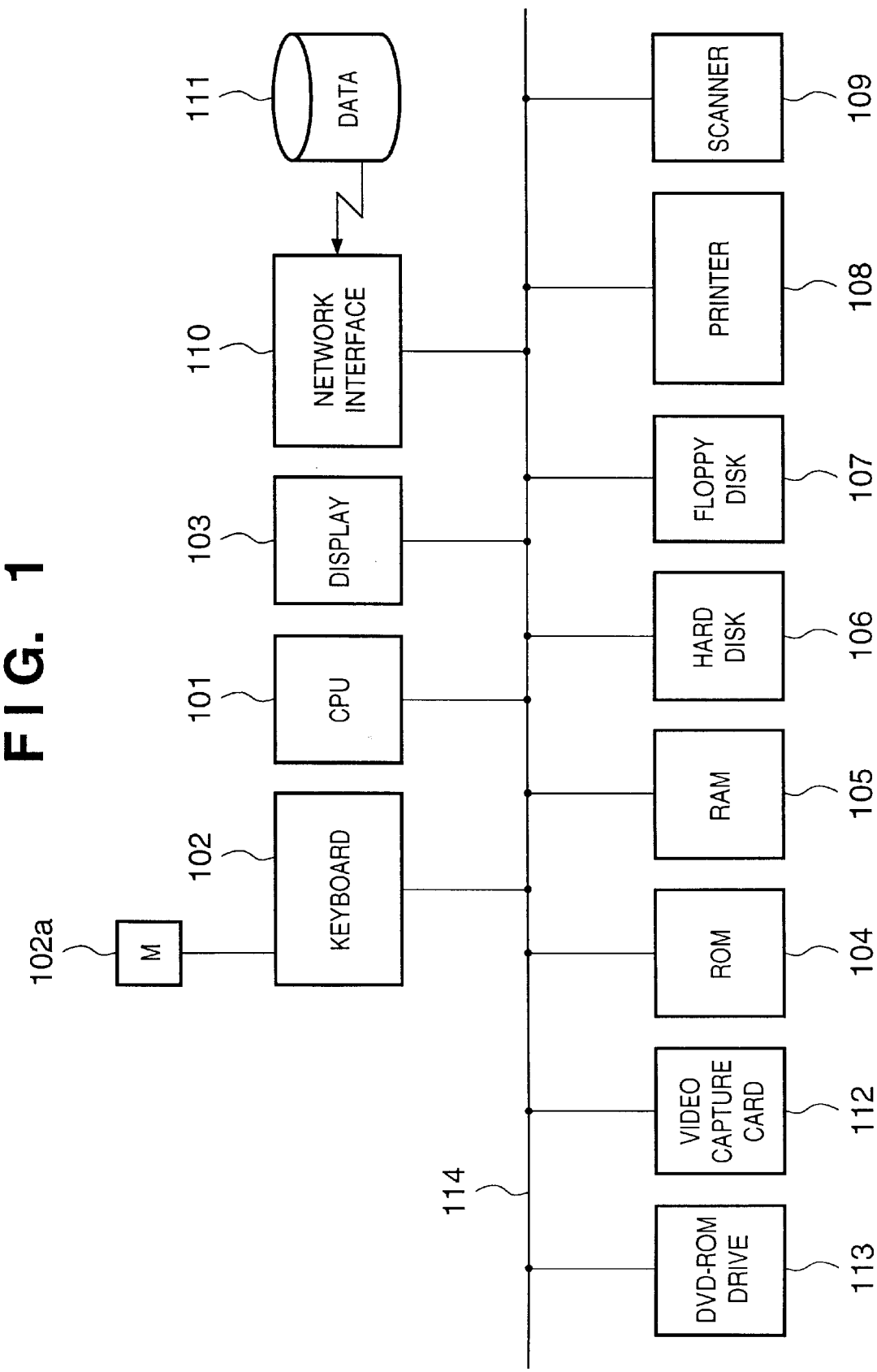
FIG. 1 is a block diagram showing the arrangement of a computer system according to an embodiment of the present invention.

FIG. 1 is a block diagram showing the arrangement of a computer system that implements image processing according to an embodiment of the present invention.

Referring to FIG. 1, reference numeral 101 denotes a CPU, which controls the entire system in accordance with a program which is stored in a hard disk 106 and is loaded onto a RAM 105. Reference numeral 102 denotes a keyboard, which is used together with a mouse 102a to input various commands and data to the system of this embodiment. Reference numeral 103 denotes a display which comprises, e.g., a CRT, a liquid crystal display, or the like. A ROM 104 and the RAM 105 construct a storage unit in the system of this embodiment, and store a program to be executed by the system, data used by the system, and the like. The hard disk 106 and a floppy disk device 107 construct an external storage device which is used by a file system of the system of this embodiment. Reference numeral 108 denotes a printer. Reference numeral 109 denotes a scanner for scanning and inputting a color or monochrome original image. Reference numeral 110 denotes a network interface which can receive data from a database 111 via a LAN, public communication network, dedicated communication network, or the like.

Reference numeral 112 denotes a video capture card; 113, a DVD-ROM drive; and 114, a bus.

Figure 2:
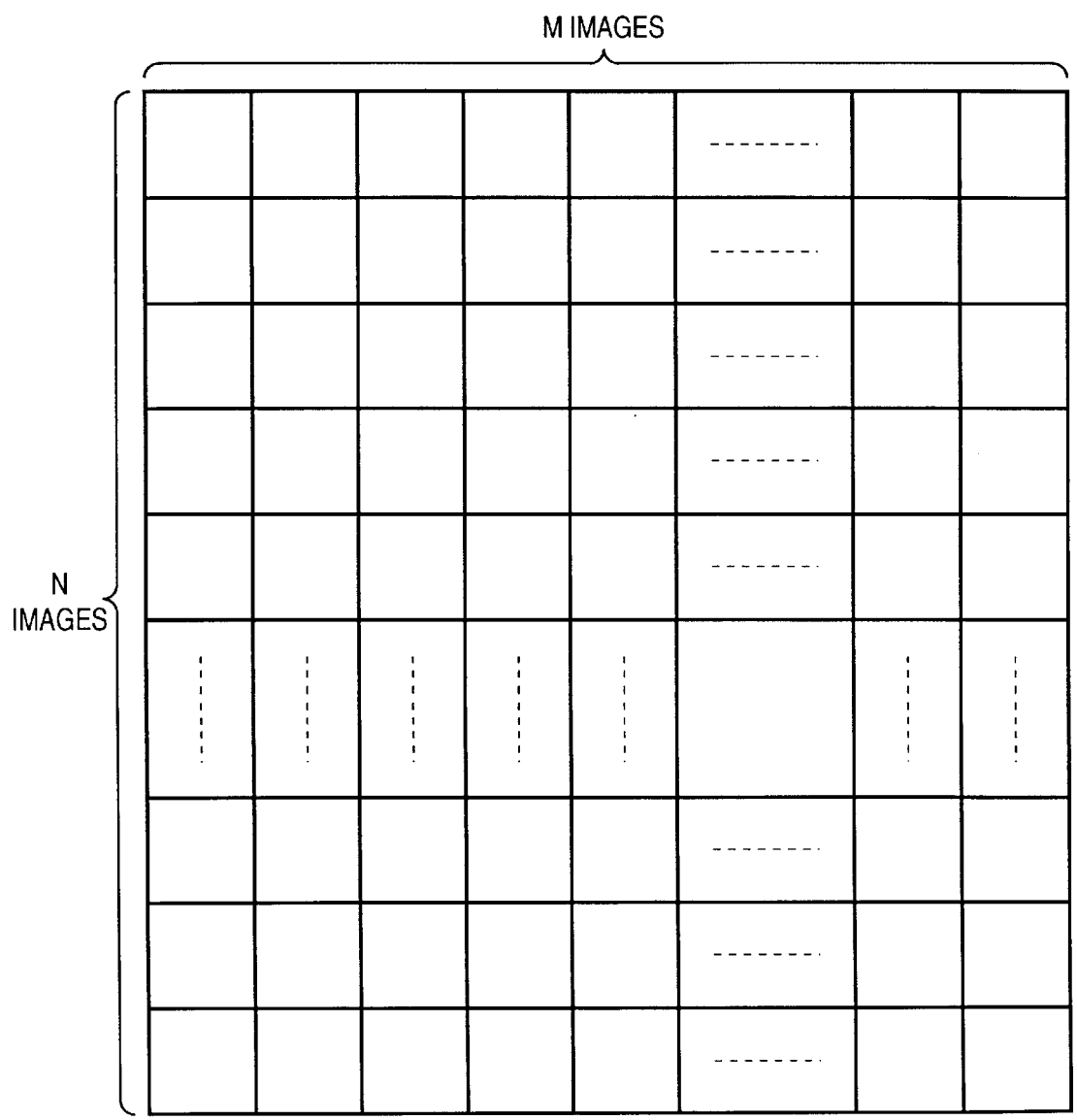
FIG. 2 is an explanatory view of a-mosaic image.

The hard disk 106 stores a plurality of (P) tile images which serve as building elements of a mosaic image, and a mosaic image is generated by inlaying M×N images selected from those images in an M×N (horizontal×vertical) matrix, as shown in FIG. 2. The generated mosaic image is stored as an image file in the hard disk 106, and is displayed on the CRT 103 or is printed out via the printer 108.

Figure 3:
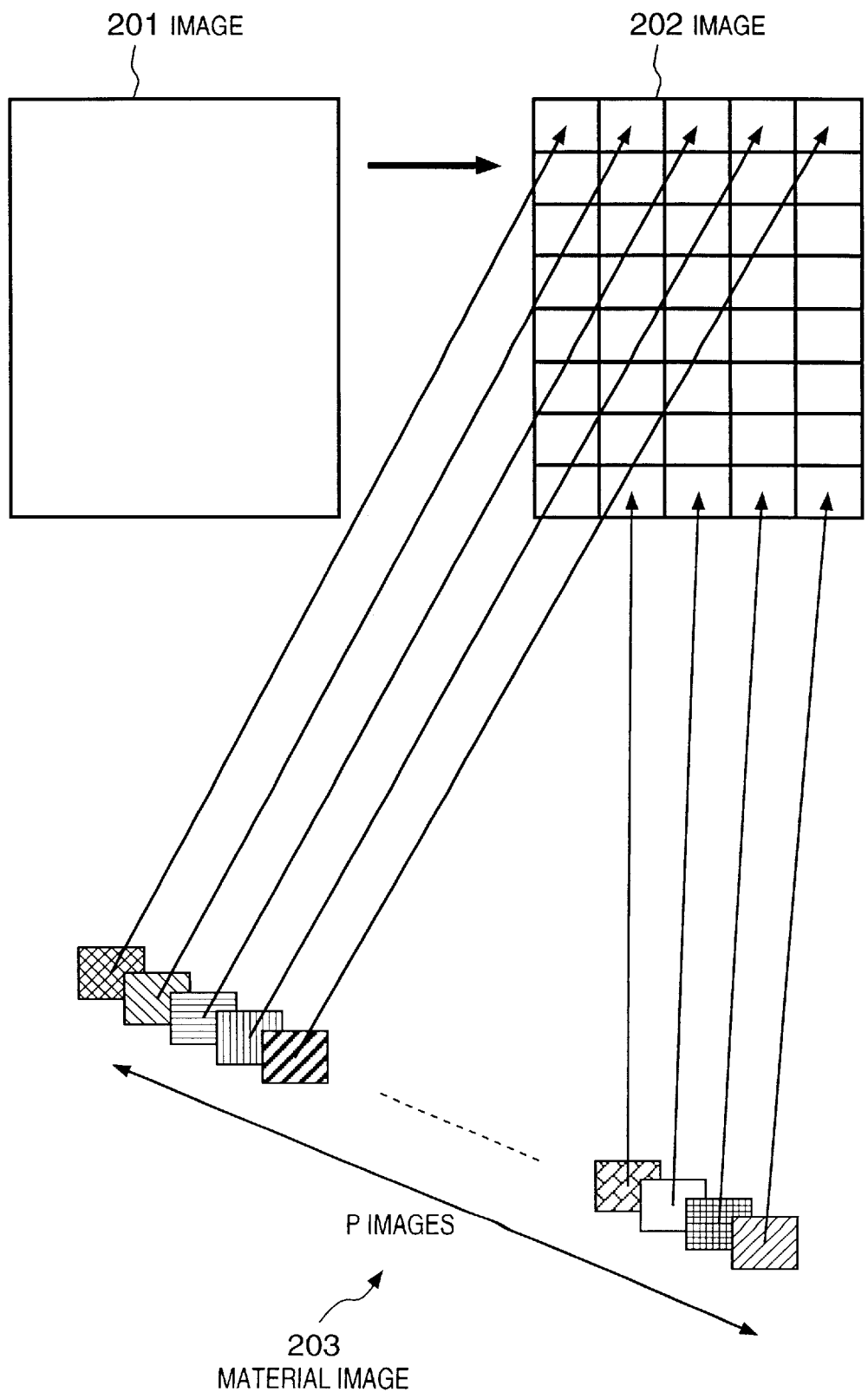
FIG. 3 is an explanatory view of the generation processes of a mosaic image.

FIG. 3 is an explanatory view of the relationship among a plurality of types of images used in mosaic.

Referring to FIG. 3, an image 201 is an original design or image upon forming an image by mosaic. An image 202 is a mosaic image formed using a plurality of small images (tiles) by mosaic. Material images 203 are used for forming the image 202. The number P of material images is normally a value large enough to prepare various types of colors and textures required for forming the image 202. For the sake of simplicity, each material image has a size equal to that of a tile. However, the material image size need not always match the tile size, and all the P images need not always have equal size. In this manner, when the material images have various sizes, the material image size must be converted upon pasting the image on a corresponding tile of the image 202.

Figure 4:
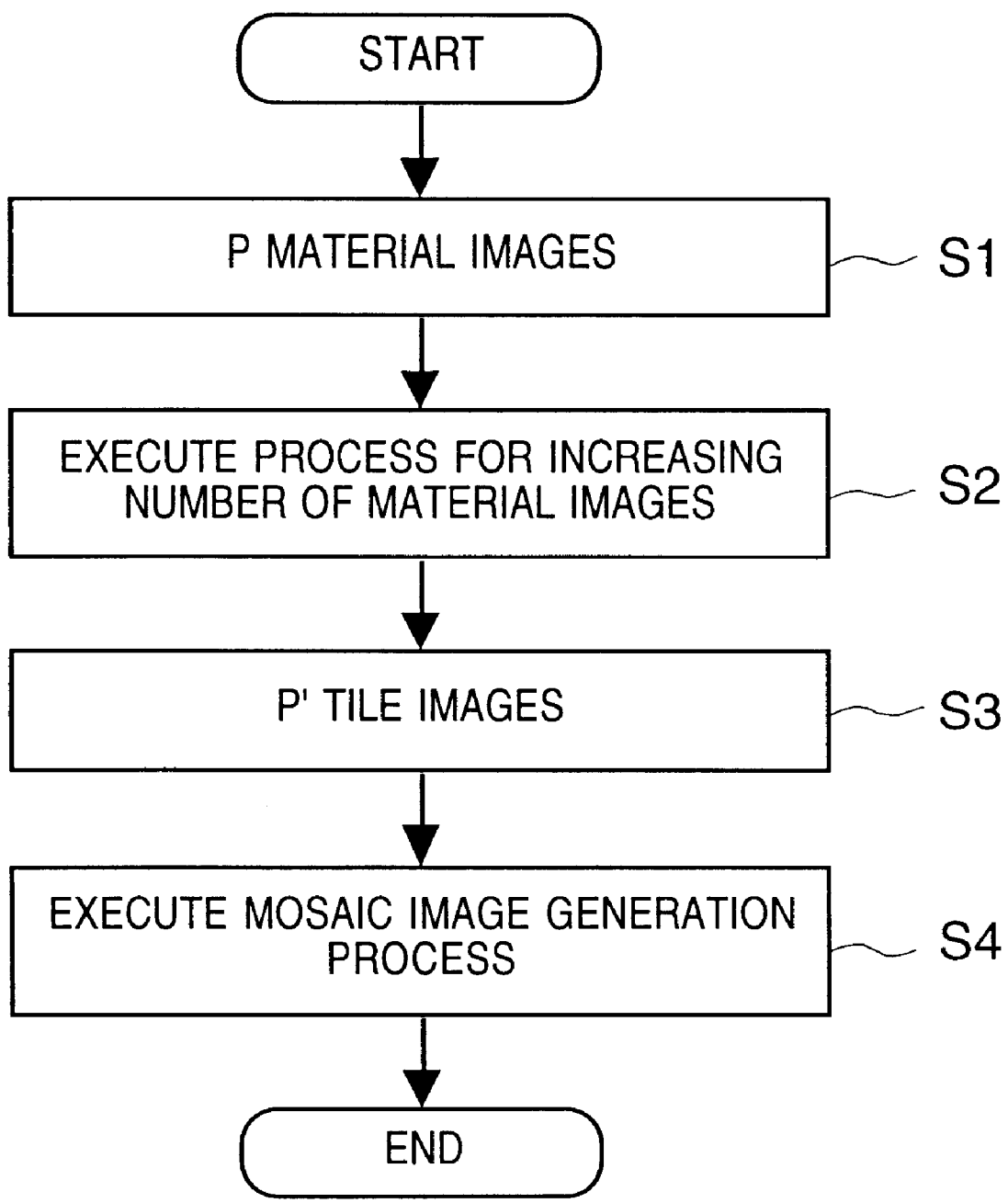
FIG. 4 is a flow chart for explaining the flow of a mosaic image generation process.

FIG. 4 is a flow chart for explaining the outline of the flow of mosaic processing in the computer system of this embodiment. In this processing, M×N images are selected from material images, the number of which has been increased, and a mosaic image is generated using the selected material images. Note that the program that implements this processing is stored in the hard disk 106, floppy disk, or the like, and is loaded onto the RAM 105 upon execution.

In step S1, P material images stored in the hard disk 106 are read out. In step S2, the number (P) of images (P images) is increased to P' larger than P (P<P'). This process will be explained in detail later with reference to FIGS. 8 and 9.

In step S3, P' material images, which are increased in number, are generated, and the flow advances to step S4. In step S4, a mosaic image is generated using these P' material images as tile images.

The material image number increase process in step S2 in FIG. 4 will be described below with reference to the flow charts in FIGS. 8 and 9.

Assume that T1, T2, . . . , TP represent P material images stored in the hard disk 106 of the system of this embodiment. Each of these material images is flipped horizontally. More specifically, TP+i represents a new material image obtained by horizontally flipping a material image Ti, and by repeating this process for all "i"s (1≦i≦P), the number of material images can be doubled from P to 2×P. Such increase in the number of material images is directed to select more appropriate material images as tile images in the subsequent step S4 (FIG. 4), and to improve the quality of a mosaic image.

Figure 8:
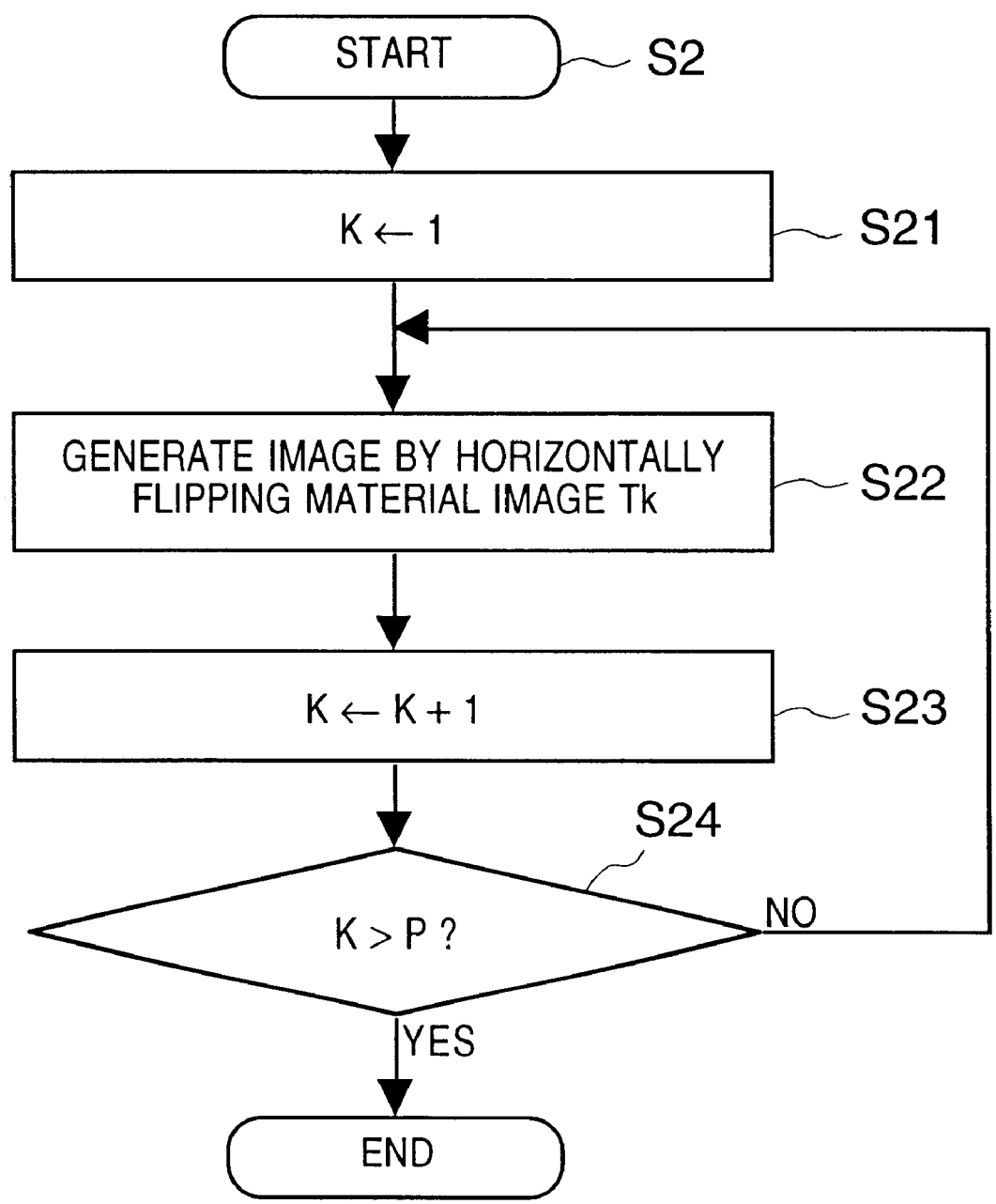
FIG. 8 is a flow chart for explaining the sequence of a material image number increase process in step S2 in FIG. 4.

FIG. 8 is a flow chart showing the process for increasing the number of material images in step S2 in FIG. 4.

In step S21, "1" is substituted in variable k. The flow advances to step S22 to generate a material image Tp+k by horizontally flipping a given material image Tk. The contents of this process will be described later with reference to the flow chart of FIG. 9.

In step S23, variable k is incremented by 1. The flow advances to step S24 to compare variable k with value p. If variable k is larger than value P, the process ends; otherwise, the flow returns to step S22.

The material image horizontal flip process in step S22 in FIG. 8 will be described below with reference to the flow chart of FIG. 9.

Assume that each material image T has a width x (pixels) and height y (pixels), and each of the R, G, and B values of a given pixel of one material image is expressed by a value ranging from "0" to "255" (8 bits). Let $R_{i,j}$ be the R value of a pixel at a position (i, j), and $G_{i,j}$ and $B_{i,j}$ be the G and B values of that pixel (for $0 \leq i \leq x-1$, $0 \leq j \leq y-1$)

A material image T' is generated based on this material image T. The generated material image T' has the same size of x×y (pixels) as that of the original material image, and the R, G, and B value of its pixel are respectively represented by $R'_{i,j}$, $G'_{i,j}$, and $B'_{i,j}$.

Figure 9:
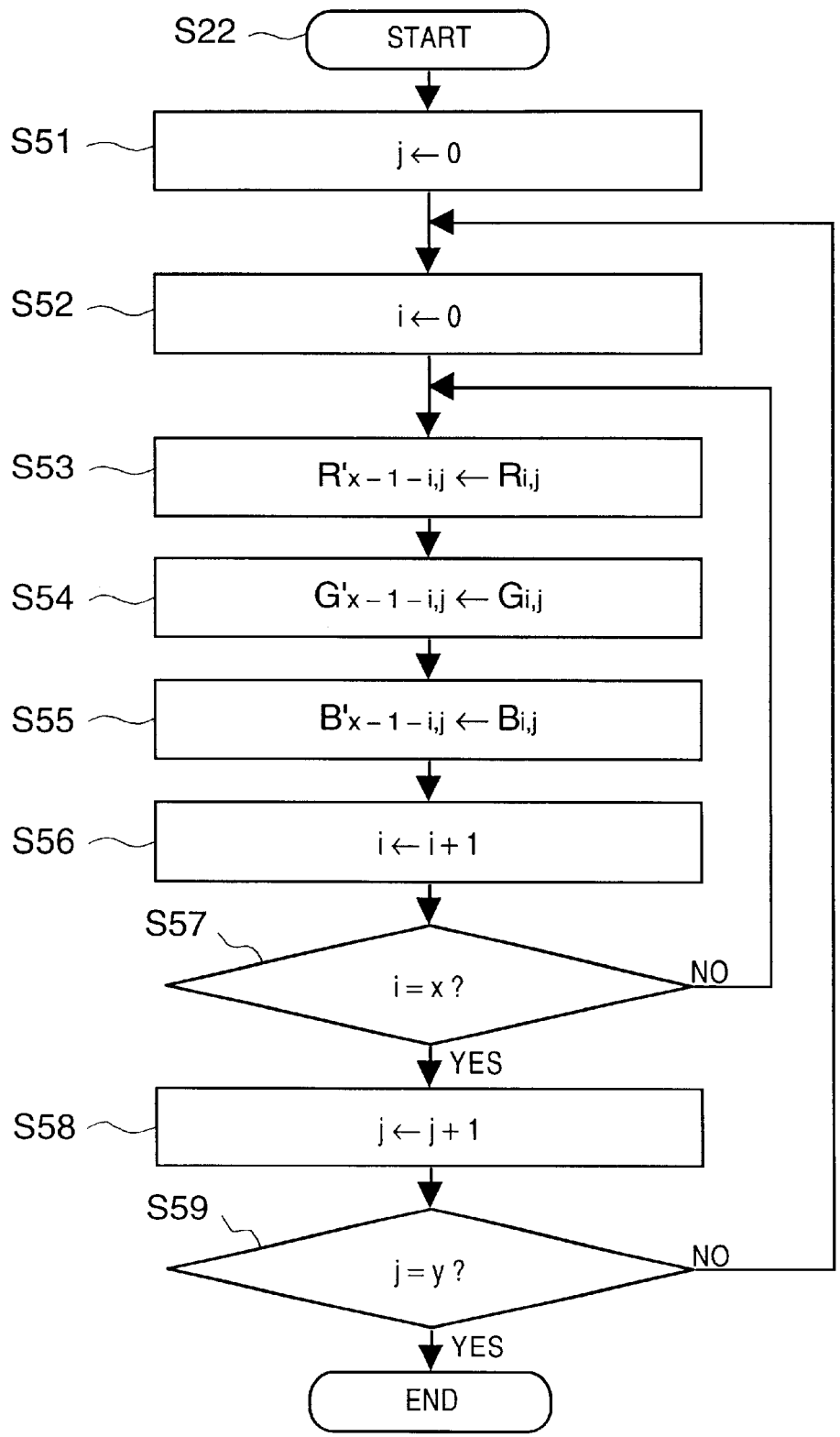
FIG. 9 is a flow chart for explaining the sequence of a material image horizontal flip process in step S22 in FIG. 8.

Referring to FIG. 9, "0" is substituted in variable j in step S51. "0" is substituted in variable i in step S52. The flow advances to step S53 to substitute an R value (Ri,j) of a pixel (i, j) of the original material image T in an R value (R'x−1−i,j) of a pixel at a position (x−1−i, j) of the material image T'. Also, in step S54, a G value (Gi,j) of the pixel (i, j) of the material image T is substituted in a G value (G'x−1−i,j) of the pixel at the position (x−1−i, j) of the material image T'. Likewise, in step S55, a B value (Bi,j) of the pixel (i, j) of the material image T is substituted in a B value (B'x−1−i,j) of the pixel at the position (x−1−i, j) of the material image T'. In this manner, the R, G, and B values (R'x−1−i,j, Gx−1−i,j, B'x−1−i,j) of the pixel at the position (x−1−i, j) of the horizontally flipped material image T' are determined.

The flow then advances to step S56 to increment variable i by "1". In step S57, the value of variable i is compared with the number "x" of horizontal pixels of the material image. If these values are equal to each other, it is determined that the process for pixels in the j-th row is complete, and the flow advances to step S58; otherwise, the flow returns to step S53 to repeat the process for pixels in that row.

In step S58, the value of variable j is incremented by 1 to select the next row. In step S59, the value of variable j is compared with "y". If the two values match each other, it is determined that the process for that material image T is complete, and the process ends; otherwise, the flow returns to step S52 to continue the process.

In this way, a material image T' can be generated by horizontally flipping a given material image T, thus doubling the number of material images.

Figure 5:
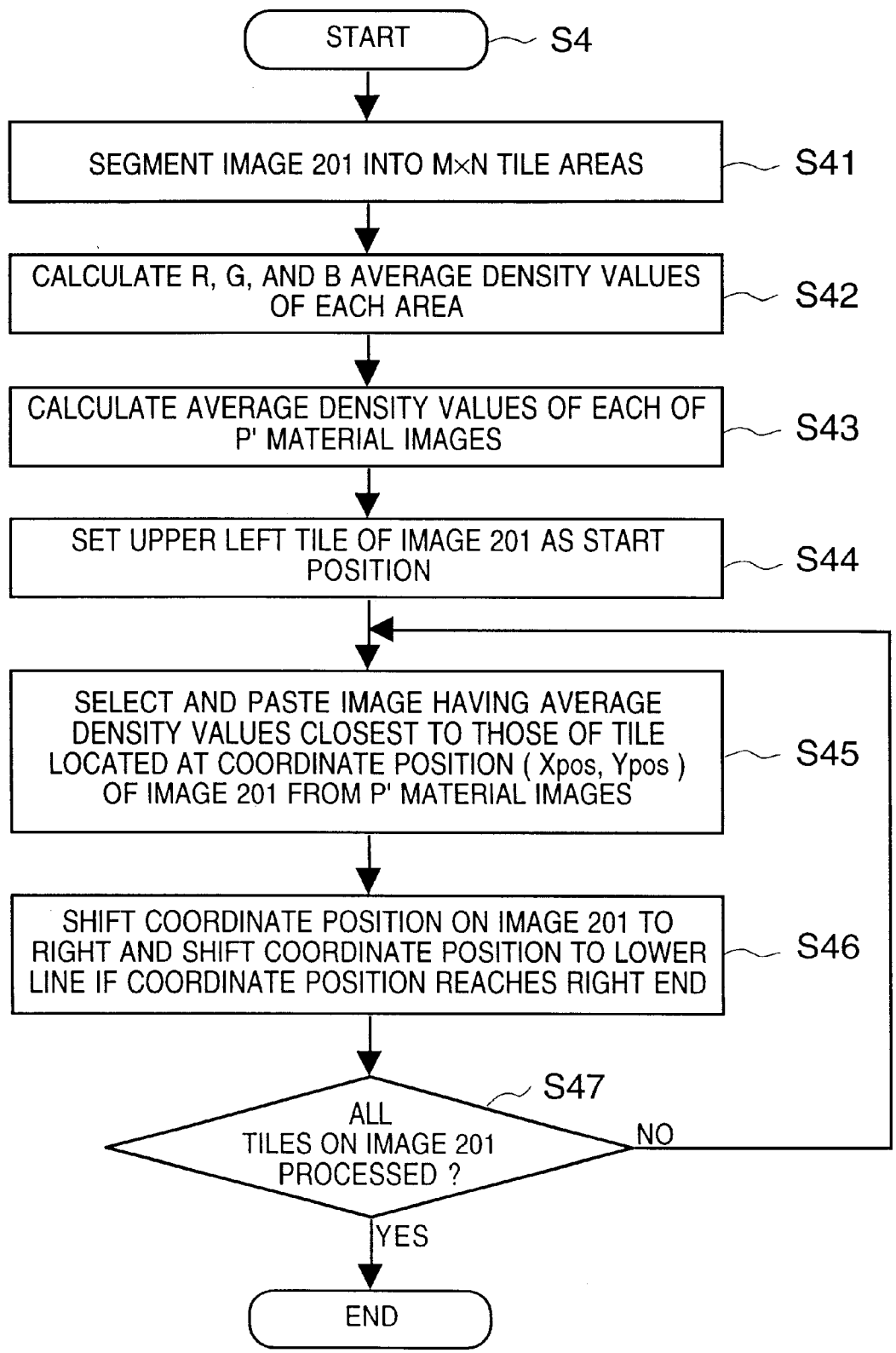
FIG. 5 is a flow chart showing the contents of mosaic image generation in step S4 in FIG. 4.

FIG. 5 is a flow chart showing mosaic image generation in step S4 in FIG. 4. The image generation method based on mosaic will be explained below with the aid of FIG. 6.

Figure 6:
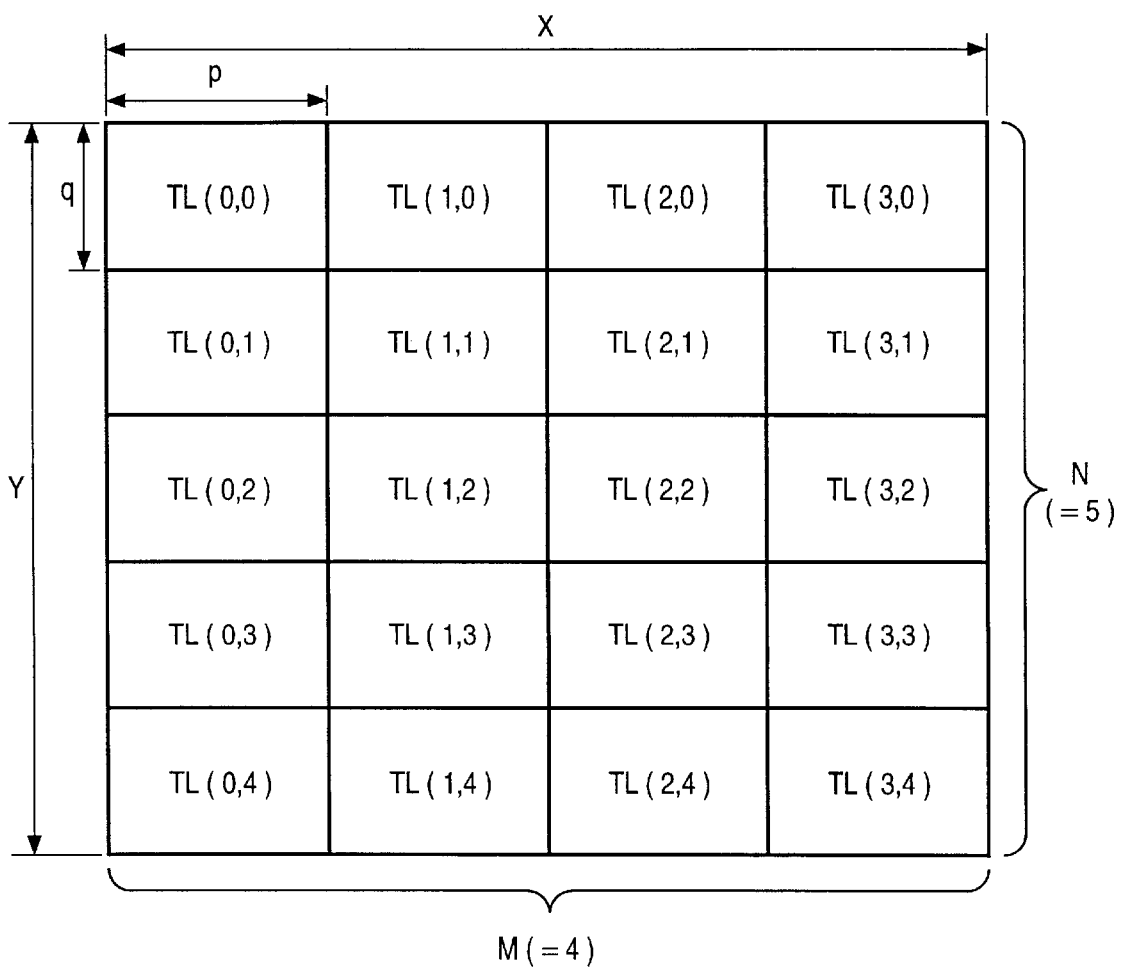
FIG. 6 is an explanatory view of an example of a mosaic image.

Referring to FIG. 6, an original image 201 is segmented into M×N tiles in step S41. As a result, M×N rectangular tiles TL(0, 0), TL(1, 0), TL(2, 0), ..., TL(2, 4), and TL(3, 4) are generated, as shown in FIG. 6. FIG. 6 shows an example segmented into 4×5 rectangles.

Referring to FIG. 6, X and Y respectively represent the numbers of horizontal and vertical pixels of the image 201, and p and q respectively represent the numbers of horizontal and vertical pixels of each tile upon segmenting the image 201 into 4×5 rectangular tiles TL(0, 0), TL(0, 1), TL(0, 2), ..., TL(2, 4), and TL(3, 4). Hence, X=p×M (M=4), and Y=q×N (N=5).

Figure 7:
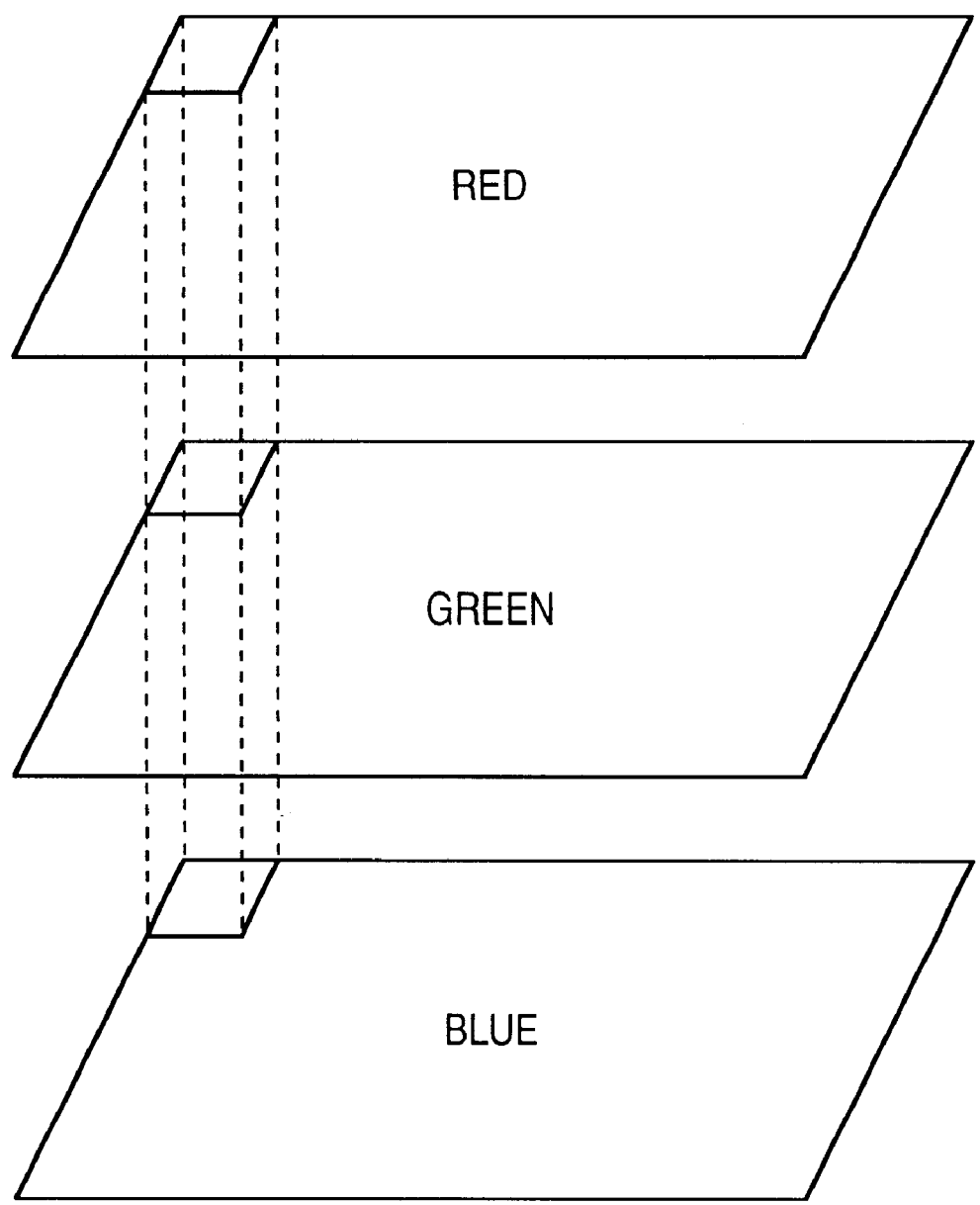
FIG. 7 is an explanatory view of the color configuration of each tile that forms a mosaic image.

FIG. 7 shows the configuration of each tile. That is, each tile is composed of p×q three primary color (red (R), green (G), and blue (B)) data.

Referring back to FIG. 5, in step S42, the R, G, and B average luminance values of each of the M×N tiles segmented in step S41 are calculated by:

$$Rd\text{-}av=(\Sigma Ri)/(p\times q) \quad (1)$$

$$Gd\text{-}av=(\Sigma Gi)/(p\times q) \quad (2)$$

$$Bd\text{-}av=(\Sigma Bi)/(p\times q) \quad (3)$$

Note that "d" is an abbreviation for destination.

The flow then advances to step S43 to calculate the R, G, and B average density values of each of P' material images:

$$Rs\text{-}av=(\Sigma Ri)/(p\times q) \quad (4)$$

$$Gs\text{-}av=(\Sigma Gi)/(p\times q) \quad (5)$$

$$Bs\text{-}av=(\Sigma Bi)/(p\times q) \quad (6)$$

Note that "s" is an abbreviation for source.

The flow advances to step S44 to reset both counters Xpos (0≦Xpos≦M−1) and Ypos (0≦Ypos≦N−1) indicating the position of a tile of interest to "0" (upper left). Note that (Xpos, Ypos)=(0, 0) indicates the upper left tile position of the original image 201. The flow advances to step S45 to select an image most suitable for a tile indicated by the values of the position counters Xpos and Ypos from the P' material images. In this selection method, a distance ΔE of R, G, and B tristimulus values given by $$\Delta E=\{(Rs\text{-}av\text{-}Rd\text{-}av)^2\}+\{(Gs\text{-}av\text{-}Gd\text{-}av)^2\}+\{(Bs\text{-}av\text{-}Bd\text{-}av)^2\} \quad (7)$$

is calculated, and a material image with the smallest ΔE is selected.

Upon pasting the image selected based on this evaluation formula on a tile area, if the sizes do not match, the image is enlarged/reduced to an appropriate size.

In step S46, the tile position to be processed is shifted to sequentially execute the aforementioned process for horizontally and vertically neighboring tiles of the image 201 (FIG. 3). The processes in steps S45 to S47 repeat themselves until it is determined in step S47 that all the tiles of the image 201 are processed.

In this manner, a mosaic image can be generated using P' material images which are increased in number from P original material images.

Second Embodiment

In the first embodiment, the pixel positions of an original material image are horizontally flipped to increase the number of material images. However, another method of increasing the number of material images may be used.

Hence, in the second embodiment, a new material image is generated by increasing (decreasing) the color values (luminance values) of all pixels of an original material image. More specifically, an R value (R'i,j) of a given pixel of a new material image (x×y) is determined by {R value (Ri,j)×α} of the corresponding pixel of the original material image. This pixel value determination process is done for all pixels (i, j) (0≦i<x, 0≦j<y). Note that α is an appropriate constant. This process is done for each of R, G, and B colors.

When the same process is repeated for a plurality of values (α0, α1, α2, ..., αn−1) of the constant α, the number of material images can be increased to a maximum of n+1 times.

Figure 10:
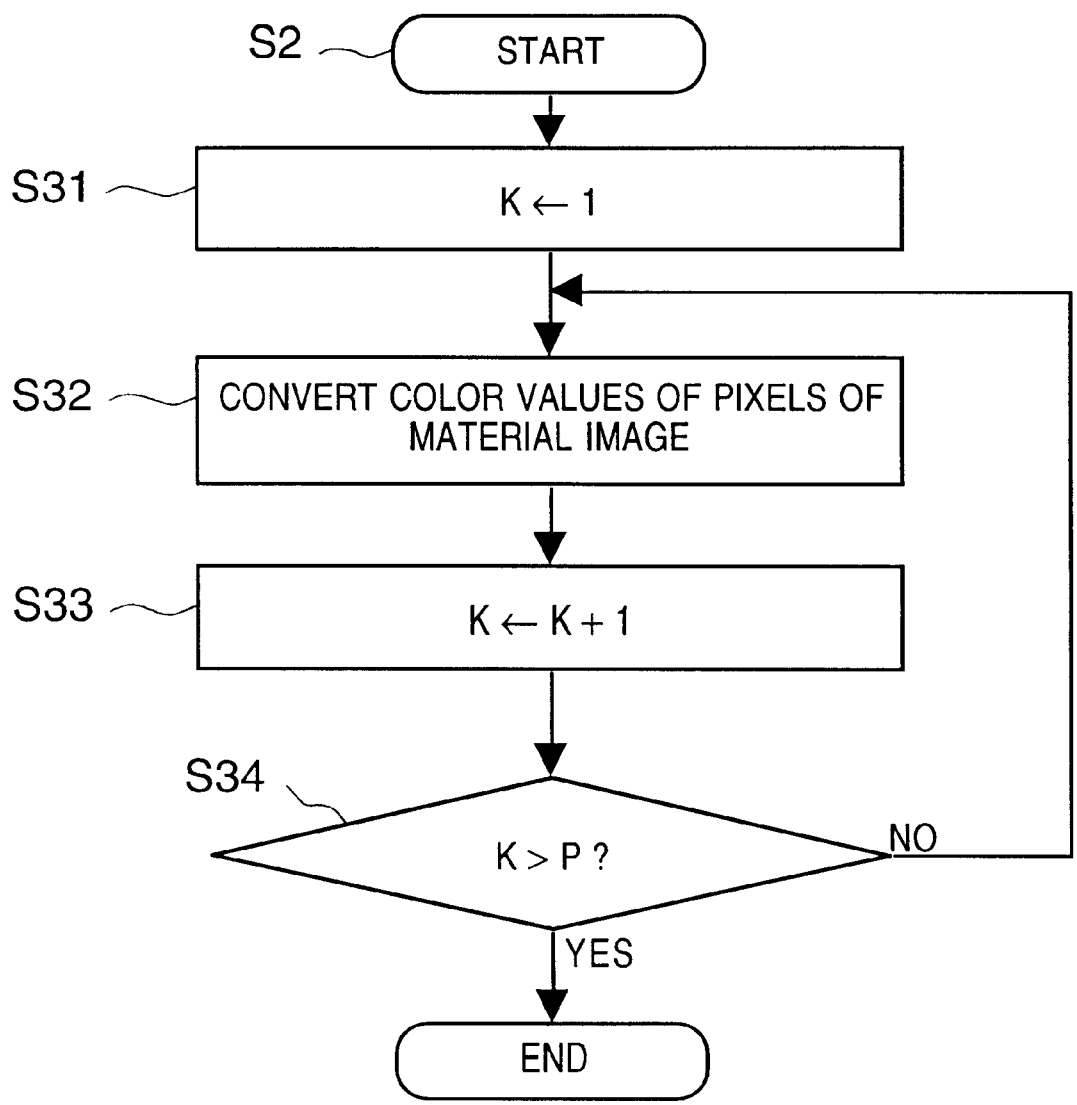
FIG. 10 is a flow chart for explaining the sequence of the material image number increase process in step S2 in FIG. 4 according to the second embodiment of the present invention.

FIG. 10 is a flow chart showing the process (S2) for increasing the number of material images in the second embodiment. This process is similar to that in the flow chart in FIG. 8, except that the color value of each pixel of the material image is converted in step S32.

Figure 11:
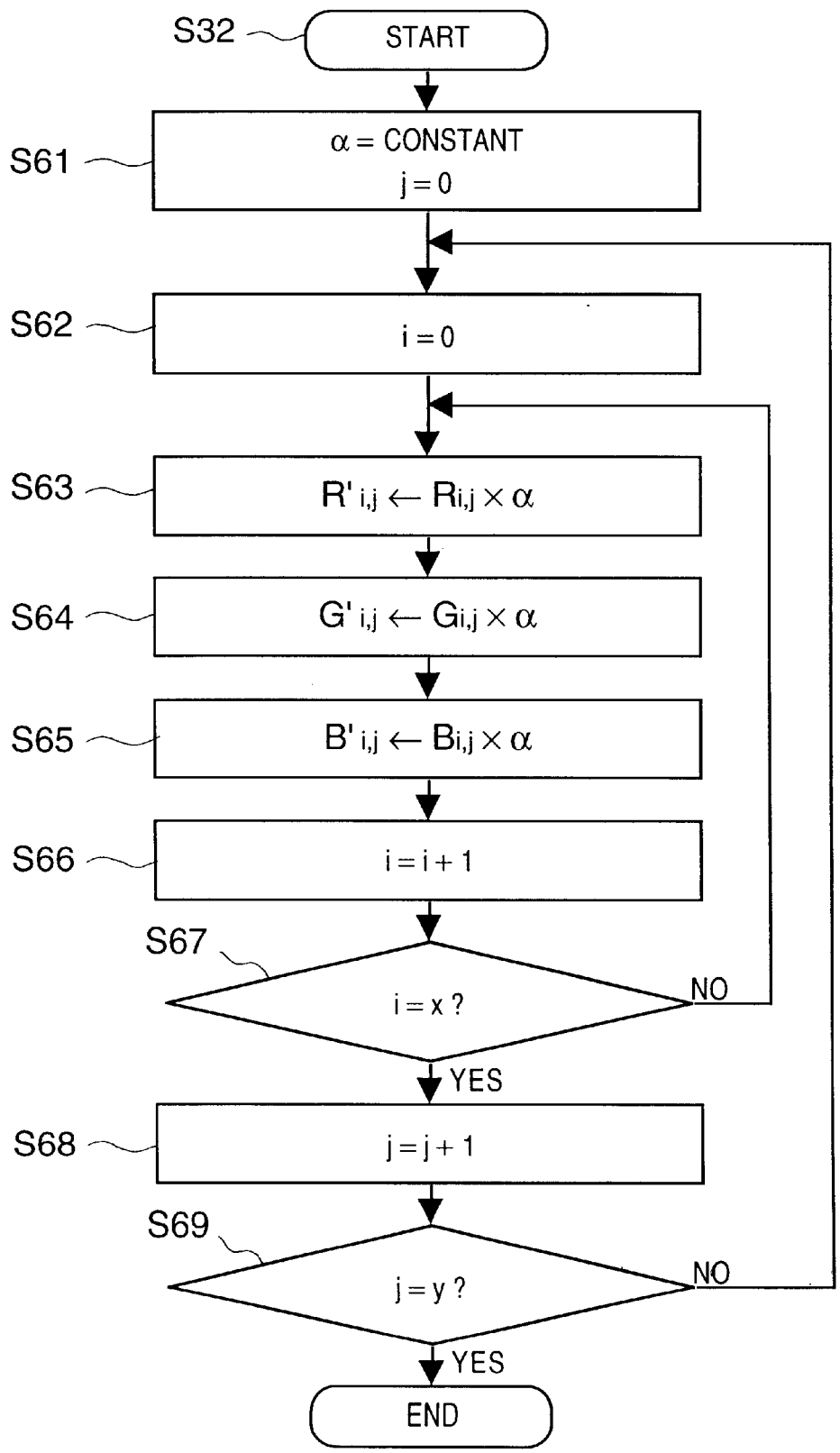
FIG. 11 is a flow chart for explaining the sequence of material image color conversion according to the second embodiment of the present invention.

FIG. 11 is a flow chart showing the process for generating a new material image (step S32 in FIG. 10) in the second embodiment.

In step S61, the value of variable j is set at "0" as in step S51 to set the value of the constant α. In step S62, the value of variable i is set at "0". In steps S63 to S65, color values (Ri,j, Gi,j, Bi,j) of a pixel (i, j) of the original material image are multiplied by the constant α to obtain values (R'i,j, G'i,j, B'i,j) of a new material image. These processes repeat themselves in steps S66 to S69 until the processes are completed for all the pixels of the material image, like in steps S56 to S59 in FIG. 9.

Note that the luminance value is linearly changed like {R value (Ri,j)×α} in this embodiment. However, the same effect can be obtained irrespective of the functions used for changing luminance.

For example, a new material image can be generated by positive/negative-reversing an original material image using a function [an R value (R'i,j) of a pixel of a new material image (x×y)←(255−Ri,j)]. In this case, functions in steps S63 to S65 in FIG. 11 can be replaced by [R'i,j←(255−Ri,j)], [G'i,j←(255−Gi,j)], and [B'i,j←(255−Bi,j)].

Third Embodiment

In the second embodiment, a new material image is generated by processing the luminance components of an original material image using the same processes for all the R, G, and B values of each pixel of an original material image. However, when the processes are done for an R value alone, a new material image having a red cast as a whole can be generated.

In this way, the quality of a mosaic image can be improved by increasing the number of new material images upon converting only a specific color component. As the specific color component, G or B alone or arbitrary two colors of R, G, and B colors may be selected and processed to obtain the same effect.

In general, a new material image (R'i,j, G'i,j, B'i,j) is obtained from pixels (Ri,j, Bi,j, Gi,j) of a material image using arbitrary functions fR, fG, and fB. That is, by executing the following conversions:

$$R'_{i,j} \leftarrow fR(R_{i,j}, G_{i,j}, B_{i,j}) \quad (8)$$

$$G'_{i,j} \leftarrow fG(R_{i,j}, G_{i,j}, B_{i,j}) \quad (9)$$

$$B'_{i,j} \leftarrow fB(R_{i,j}, G_{i,j}, B_{i,j}) \quad (10)$$

a new material image can be generated by processing color difference components, and the number of material images used upon generating a mosaic image can be increased.

As described above, according to this embodiment, since the number of source images of tile images that form a mosaic image can be increased, the quality of a mosaic image using these tile images can be improved.

To restate, according to the present invention, the number of selection of material images to form a mosaic image can be increased, and the quality of a mosaic image generated using those images can be improved.

Also, according to the present invention, many material images can be generated from a limited number of stored material images, and a mosaic image can be generated using these material images.

Fourth Embodiment

The first embodiment allows extraction of an optimal image to each tile. However, the first embodiment is premised on that the number P of material image is generally a value large enough to prepare various types of colors and textures required for forming the second image 202. However, in practice, it is difficult to prepare a huge number of images in advance, and a small number of material images must be used. For this reason, the formed second image has poor image quality as a mosaic image. This problem is solved by the fourth embodiment or the fifth and sixth embodiments to be described below.

In this embodiment, a material image is formed by capturing a moving image at a predetermined timing, and by continuing this process, the modulus of objects to be compared can be increased. Also, by continuing this process, the image quality of a mosaic image can be gradually improved.

In the block diagram shown in FIG. 1, the display 103 displays the image 201, image 202, and material images 203.

The video capture card 112 is connected to a video player, TV tuner, or DVD player (not shown), temporarily records a video signal input via a video interface in its memory, compresses that video signal as needed, and stores the signal in the hard disk 106.

Also, the DVD-ROM drive 113 may be used for capturing video data recorded on a DVD-ROM.

By issuing a command to the video capture card 112 via a program interface, still image data is captured from the input video signal on a memory. When this command is issued at predetermined time intervals, new still images are sequentially recorded on the hard disk.

Figure 12:
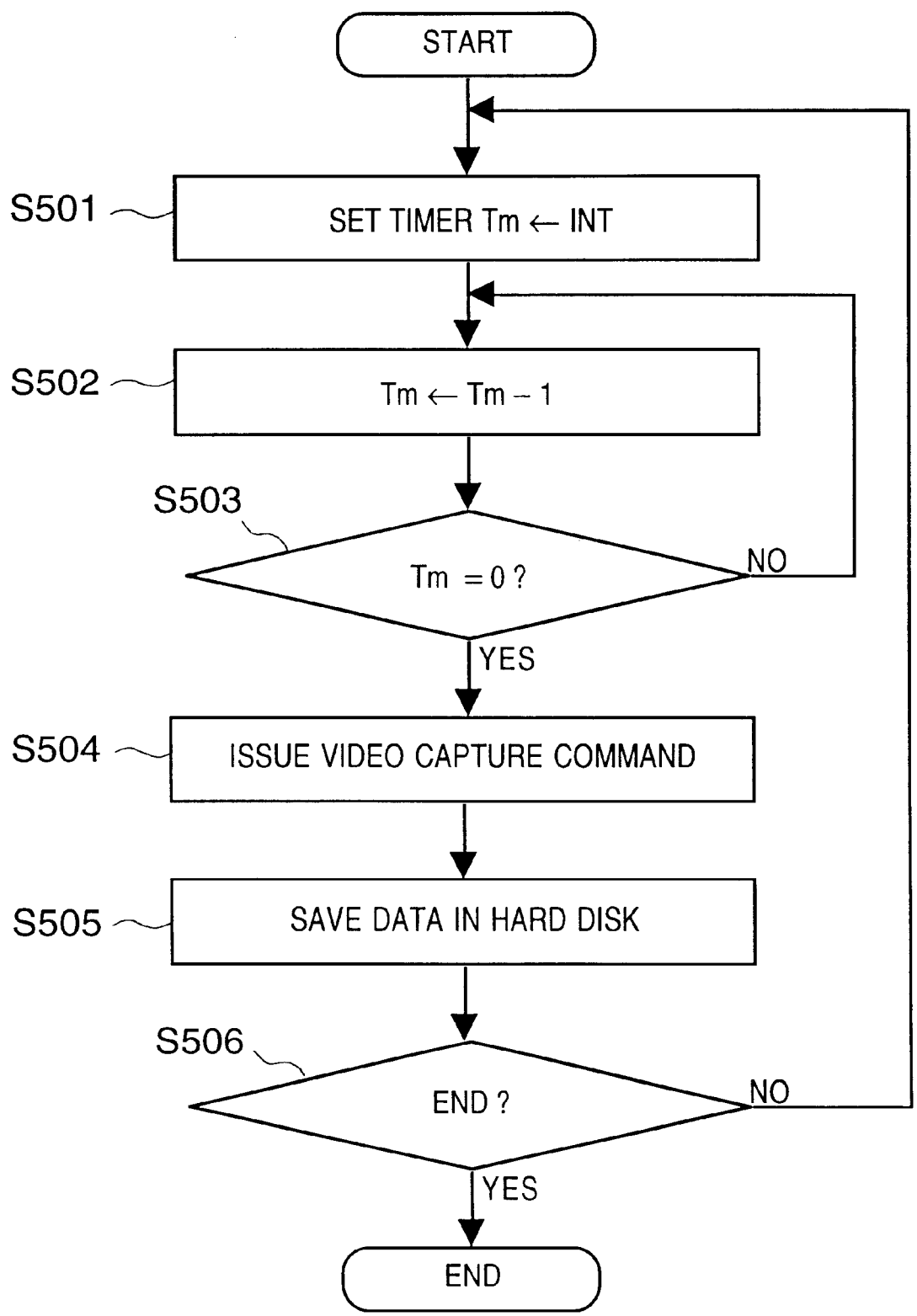
FIG. 12 is a flow chart for explaining the sequence of moving image capturing according to the fourth embodiment of the present invention.

FIG. 12 is a flow chart showing the processing for capturing a moving image at predetermined time intervals.

In step S501, a timer variable Tm is set at a given value INT. In step S502, 1 is subtracted from TM. It is checked in step S503 if TM=0. If YES in step S503, a video capture command is issued. If NO in step S503, the flow returns to step S502 to repeat the process. After still image data is captured from an input video signal in step S504, the still image data is recorded on the hard disk in step S505. It is checked in step S506 if an end instruction is input. If no end instruction is input (step S506–NO), the flow returns to step S501 to repeat the process. Still image data captured by this process is used as a material image to form a mosaic image.

If it is determined in step S506 that an end instruction is input (S506–YES), the process ends. Note that the end instruction is inputted by a keyboard or mouse in a flow (not shown).

Figure 13:
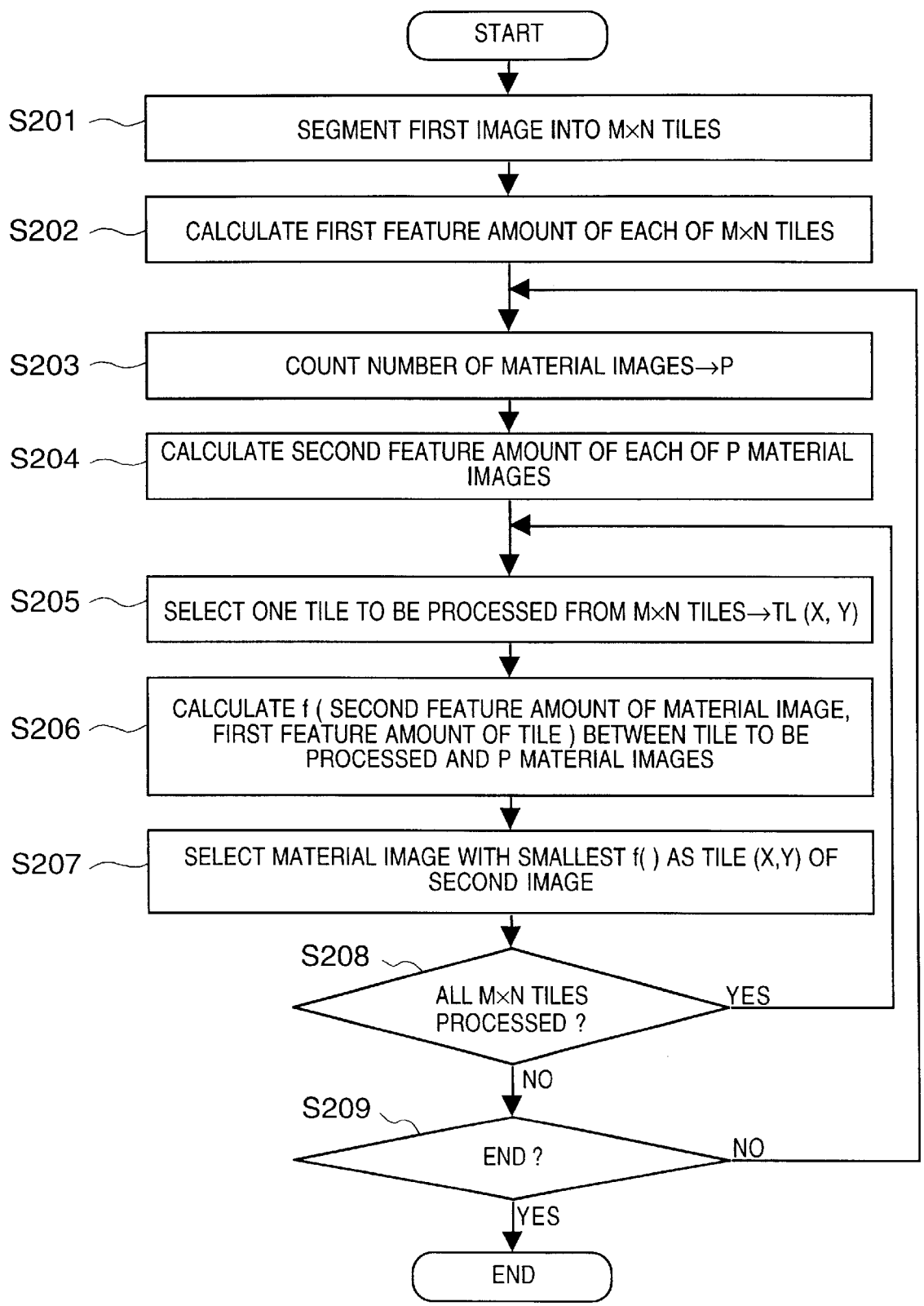
FIG. 13 is a flow chart for explaining the sequence of the method for forming a mosaic image according to the fourth embodiment of the present invention.

The method of forming a mosaic image will be described below with reference to FIG. 13.

In step S201, an image 201 (FIG. 2) is segmented into M×N tile areas, as shown in FIG. 6.

In step S202, a first feature amount of each of the M×N tiles segmented in step S201 is calculated. In order to form a mosaic image, an image of each tile area obtained by segmenting the image 201 must be similar to a material image to be pasted on that tile to imitate it, under given common evaluation criteria.

Note that the first feature amount is obtained by calculating a feature amount of each of segmented tiles of the first image 201 by a predetermined method. When R, G, and B average luminance values are used as the feature amount, the first feature amount can be obtained using equations (1) to (3).

In step S203, the number of material images is counted, and the count result is substituted in parameter P indicative of the number of material images. As shown in FIG. 12, material images are still images captured from a video signal at predetermined timings by the video capture card 112, and the number of material images in the hard disk 106 increases along with an elapse of time by continuously capturing still images. The following processes in steps S204 to S207 are done to set and calculate a second feature amount of a still image (serving as a material image) captured in step S203.

In step S204, second feature amounts of P material images are calculated. The second feature amount is the same as the feature amount used in step S202. When R, G, and B average luminance values are used as the feature amount, the second feature amount can be obtained using equations (4) to (6).

In step S205, one tile to be processed is selected from the M×N tiles. For example, when the processing position shifts from the upper left position to the right end on an image and then shifts to a lower line, counters X-Pos (0≦X-Pos≦M−1) and Y-Pos (0≦Y-Pos=N−1) indicating the tile position are reset to zero.

An image segmented into tile areas is expressed by a two-dimensional matrix TL(X, Y), and a loop is defined using the counters (X-Pos, Y-Pos) indicating a position as controlled variables, thus sequentially selecting images of segmented tile areas.

In step S206, the first feature amount of the tile area to be processed and the second feature amount of each of P material images are evaluated using an evaluation function f( ). As an example of the evaluation function f( ), a mean square of R, G, and B average luminance values is used, and is calculated by equation (7). The R, G, and B average luminance values are data obtained based on equations (1) to (6).

The mean square given by equation (7) is computed for one image of the selected tile area in correspondence with the number of material images. Hence, when the number of material images is P, P mean square computations are done per tile image.

In step S207, a material image having the smallest one of the P computation results of the mean square evaluation function is selected, and is determined as a tile to be pasted on the second image 202.

It is checked in step S208 if that process is done for all tile images of the first image. If non-processed tile images remain, the flow returns to step S205 to continue the process. If the process is complete for all the tiles, the flow advances to step S209. It is checked in step S209 if an end instruction is input from the keyboard 104. If YES in step S209, the processing ends; otherwise, the flow returns to step S203 to repeat the process.

According to this embodiment, a moving image is captured as still images at predetermined timings, and the captured still images are stored as material images. By comparing the feature amounts of each material image 203 and each of tile images obtained by segmenting the first image 201, a material image with the minimum mean square of errors is selected. In place of saving a huge size of material data all the time, since still images are captured from moving image data which has high correlation to the first image 201 and are used as material images, a mosaic image which minimizes the feature amount error can be formed.

The number of material images can be increased as the modulus of objects to be compared by continuously capturing still images at predetermined timings. The feature amounts are compared with those of newly added material images, and a material image with the minimum error is selected. By continuing this process, the image quality of a mosaic image can be gradually improved.

Fifth Embodiment

In this embodiment, the processing is done by limiting the number of computations to only the number of non-processed material images newly added as material images upon forming a mosaic image.

Since the hardware arrangement of this embodiment is the same as that shown in FIG. 1, and the flow for generating material images from a moving image is the same as that shown in FIG. 12, a detailed description thereof will be omitted.

The method of forming a mosaic image according to this embodiment will be described below with reference to FIG. 14.

In step S301, an image 201 (FIG. 3) is segmented into M×N tiles, as shown in FIG. 6.

In step S302, a first feature amount of each of the M×N tiles segmented in step S301 is calculated. In order to form a mosaic image, an image of each tile area obtained by segmenting the first image must be similar to a material image to be pasted on that tile to imitate it, under given common evaluation criteria. Note that the first feature amount is obtained by calculating a feature amount of each of segmented tiles of the first image by a predetermined method. When R, G, and B average luminance values are used as the feature amount, the first feature amount can be obtained using equations (1) to (3).

In step S303, a processed material image list La is cleared. The processed material image list La is a data table that records indices of material images.

In step S304, a material image list Lb is created. The material image list Lb is a data table that records indices of material images, and records indices of material images obtained by scanning those stored in the hard disk 106. As shown in FIG. 12, material images are still images captured from a video signal at predetermined timings by the video capture card 112, and the number of material images in the hard disk 106 increases along with an elapse of time by continuously capturing still images.

In step S305, a non-processed material image list Lc is created by excluding material images included in the processed image list La from the material image list Lb. Assume that Pc represents the number of non-processed material images in the list Lc.

In step S306, second feature amounts of Pc material images in the non-processed material image list Lc are calculated. The second feature amount is the same as the feature amount used in step S302. When R, G, and B average luminance values are used as the feature amount, the second feature amount can be obtained using equations (4) to (6).

In step S307, one tile to be processed is selected from the M×N tiles. For example, when the processing position shifts from the upper left position to the right end on an image and then shifts to a lower line, counters X-Pos ($0 \leq$ X-Pos $\leq$ M−1) and Y-Pos ($0 \leq$ Y-Pos $\leq$ N−1) indicating the tile position are reset to zero.

An image segmented into tile areas is expressed by a two-dimensional matrix TL(X, Y), and a loop is defined using the counters (X-Pos, Y-Pos) indicating a position as controlled variables, thus sequentially selecting images of segmented tile areas.

In step S308, the first feature amount of the tile to be processed and the second feature amount of each of Pc material images in the non-processed material image list Lc are evaluated using an evaluation function f( ). As an example of the evaluation function f( ), a mean square of R, G, and B average luminance values calculated by equation (7) is used. The R, G, and B average luminance values are data obtained based on equations (1) to (6).

The mean square given by equation (7) is computed for one image of the selected tile area in correspondence with the number of material images. Hence, when the number of material images is Pc, Pc mean square computations are done per tile image.

In step S309, a material image having the smallest one of the Pc computation results of the evaluation function is selected, and is determined as a tile to be pasted on the second image.

It is checked in step S310 if that process is done for all tile images of the first image. If non-processed tile images remain, the flow returns to step S307 to continue the process. If the process is complete for all the tiles, the flow advances to step S311.

In step S311; the processed material image in the material image list Lc is added to the processed material image list La. Alternatively, substitution of the material image list Lb in the processed material image list La yields the same result.

It is checked in step S312 if an end instruction is input from the keyboard 104. If YES in step S312, the processing ends; otherwise, the flow returns to step S304 to repeat the process.

According to this embodiment, since the number of computations for comparing the feature amounts of a tile image and material image can be limited to the number of newly added, non-processed material images, the processing speed can be improved.

Sixth Embodiment

In this embodiment, a predetermined error reference value is used, and a tile image which satisfies this reference value and for which a material image has been determined is excluded from feature amount comparison targets, thus limiting the number of computations to only the number of tiles in a re-processing tile list.

Figure 15B:
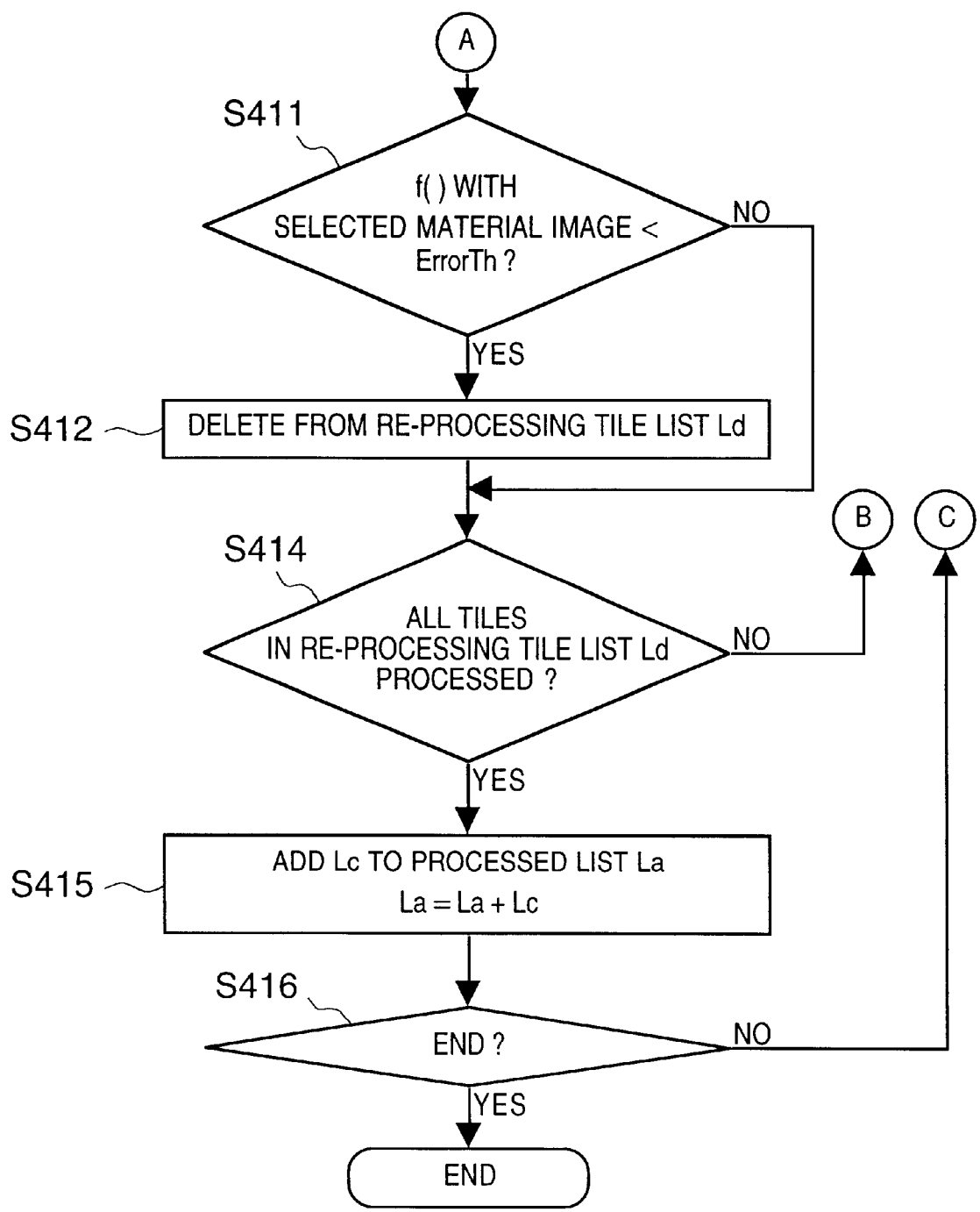

Since the hardware arrangement of this embodiment is the same as that shown in FIG. 1, and the flow for generating material images from a moving image is the same as that shown in FIGS. 15A and 15B, a detailed description thereof will be omitted.

In step S401, an image 201 (FIG. 3) is segmented into M×N tiles, as shown in FIG. 6.

In step S402, a first feature amount of each of the M×N tiles segmented in step S401 is calculated. The first feature amount is calculated using equations (1) to (3) as in the above embodiments.

In step S403, indices of all the tiles segmented in step S401 are recorded in a re-processing tile list Ld.

In step S404, a processed material image list La is cleared. The processed material image list La is a data table that records indices of material images which have already undergone feature amount comparison computations with tile images.

In step S405, a material image list Lb is created. The material image list Lb is a data table that records indices of material images, and records indices of material images obtained by scanning those stored in the hard disk 106. As shown in FIG. 5, material images are still images captured from a video signal at predetermined timings by the video capture card 112, and the number of material images in the hard disk 106 increases along with an elapse of time by continuously capturing still images.

In step S406, a non-processed material image list Lc is created by excluding material images included in the processed image list La from the material image list Lb. Assume that Pc represents the number of non-processed material images in the list Lc.

In step S407, second feature amounts of Pc material images in the non-processed material image list Lc are calculated. The second feature amount can be obtained using equations (4) to (6).

In step S408, one tile to be processed is selected from those in the re-processing tile list Ld. When this process is done for the first time, one tile is selected from all the M×N tiles. For example, when the processing position shifts from the upper left position to the right end on an image and then shifts to a lower line, counters X-Pos ($0 \leq$ X-Pos $\leq$ M−1) and Y-Pos ($0 \leq$ Y-Pos $\leq$ N−1) indicating the tile position are reset to zero.

An image segmented into tile areas is expressed by a two-dimensional matrix TL(X, Y) based on the re-processing tile list Ld, and a loop is defined using the counters (X-Pos, Y-Pos) indicating a position as controlled variables, thus sequentially selecting images of segmented tile areas.

In step S409, the first feature amount of the tile to be processed and the second feature amount of each of Pc material images in the non-processed material image list Lc are evaluated using an evaluation function f( ). As an example of the evaluation function f( ), a mean square of R, G, and B average luminance values calculated by equation (7) is used.

The mean square given by equation (7) is computed for one image of the selected tile area in correspondence with the number of material images. Hence, when the number of material images is Pc, Pc mean square computations are done per tile image.

In step S410, a material image having the smallest one of the Pc computation results of the evaluation function is selected, and is determined as a tile to be pasted on the image 202.

It is checked in step S411 if the evaluation result ΔE in step S410 is smaller than a predetermined error reference value ErrorTh. If YES in step S411 (ΔE<ErrorTh), the flow advances to step S412, and the index of the tile image of interest is deleted from the re-processing tile list Ld. On the other hand, if NO in step S411 (ΔE>ErrorTh), the flow jumps to step S414.

It is checked in step S414 if all the tiles in the re-processing tile list Ld are processed. If non-processed tile still remain, the flow returns to step S408 to repeat the process. On the other hand, if all the tiles have been processed, the flow advances to step S415.

In step S415, the processed material image in the material image list Lc is added to the processed material image list La. Alternatively, substitution of the material image list Lb in the processed material image list La yields the same result.

It is checked in step S416 if an end instruction is input from the keyboard 104. If YES in step S416, the processing ends; otherwise, the flow returns to step S405 to repeat the process.

According to this embodiment, a predetermined error reference value is used, and a tile image which satisfies this reference value and for which a material image has been determined is excluded from feature amount comparison targets, thus limiting the number of computations to only the number of tiles in a re-processing tile list. Hence, the number of computations can be further reduced, and the processing speed can be improved.

To recapitulate, according to the present invention, a moving image is captured as still images at predetermined timings, and the captured still images are stored as material images. In place of saving a huge size of material data all the time, since still images are captured from moving image data which has high correlation to the original image and are used as material images, a mosaic image which minimizes the feature amount error can be formed.

The number of material images can be increased as the modulus of objects to be compared by continuously capturing still images at predetermined timings. The feature amounts are compared with those of newly added material images, and a material image with the minimum error is selected. By continuing this process, the image quality of a mosaic image can be gradually improved.

Since the number of computations for comparing the feature amounts of a tile image and material image can be limited to the number of newly added, non-processed material images, the processing speed can be improved.

Furthermore, a predetermined error reference value is used, and a tile image which satisfies this reference value and for which a material image has been determined is excluded from feature amount comparison targets, thus limiting the number of computations to only the number of tiles in a re-processing tile list. Hence, the number of computations can be further reduced, and the processing speed can be improved.

Seventh Embodiment

In the seventh embodiment according to the present invention, the color of the entire original image 201 is converted into that suitable for material images to make the color distribution of the original image close to those of material images.

Figure 16:
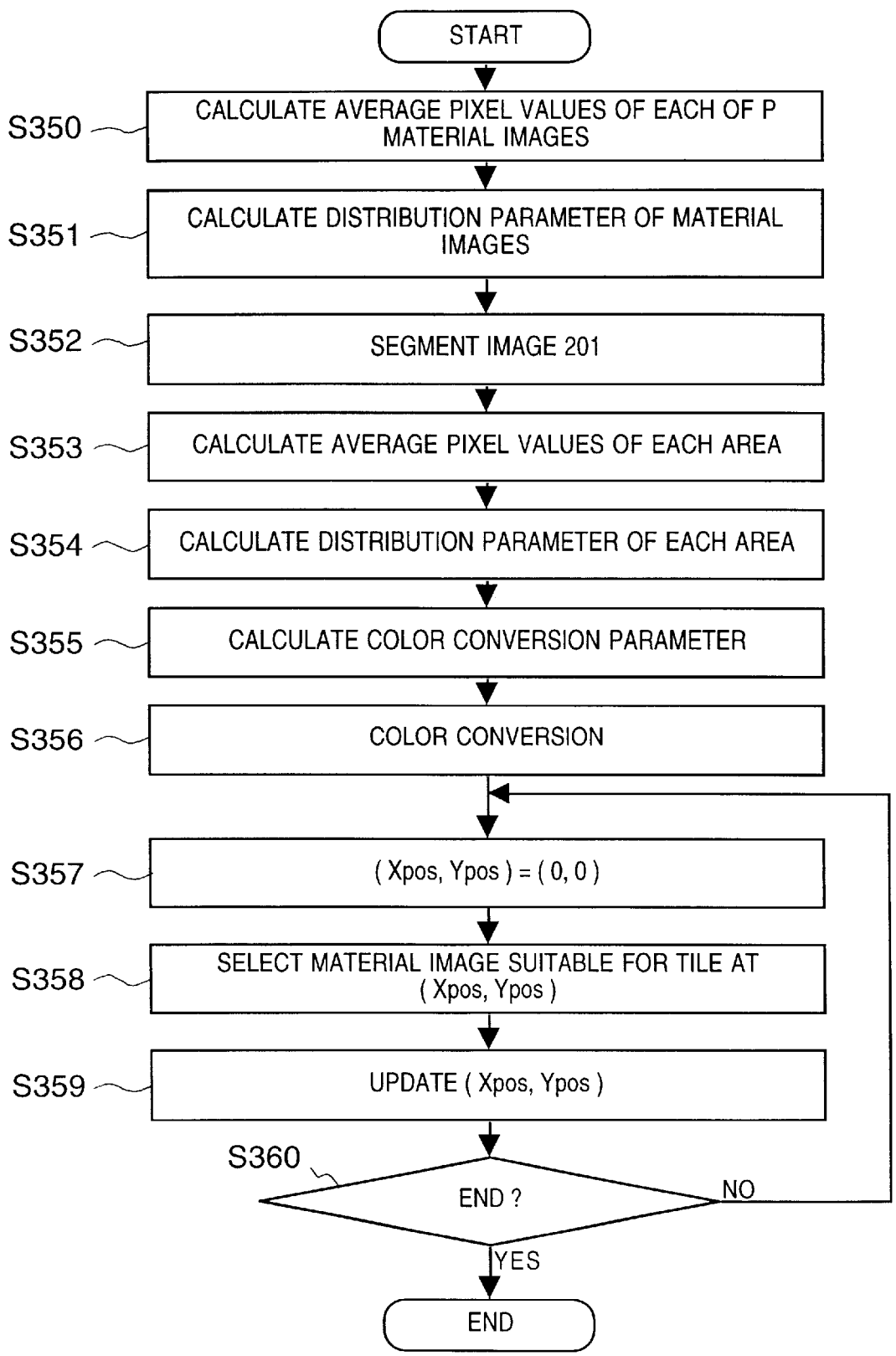
FIG. 16 is a flow chart for explaining the sequence of the method for forming a mosaic image according to the seventh embodiment of the present invention.

FIG. 16 is a flow chart showing the method of generating a mosaic image in a computer system of this embodiment. In this embodiment, the hardware arrangement is common to that in FIG. 1.

Referring to FIG. 16, the average pixel values of each of P material images 203 are calculated in step S350. In general, each pixel value of a material image is expressed by a calorimetric system such as RGB, L*a*b*, or the like. In this embodiment, assuming that each pixel value is expressed by an RGB calorimetric system for the sake of simplicity, each material image can be separated into three primary colors, i.e., red (R), green (G), and blue (B). Hence, in step S350, R, G, and B average density values are calculated by equations below. If (Ri(I), Gi(I), and Bi(I)) represent the pixel values of the i-th pixel of the I-th material image of P material images ($0 \leq I \leq P$), the average pixel values of the I-th material image are given by:

$$Rs\_av(I) = \Sigma Ri(I)/(p \times q) \tag{11}$$

$$Gs\_av(I) = \Sigma Gi(I)/(p \times q) \tag{12}$$

$$Bs\_av(I) = \Sigma Bi(I)/(p \times q) \tag{13}$$

where $\Sigma Ri(I)$ is the total of pixels of red components of the I-th material image. Likewise, $\Sigma Gi(I)$ is the total of green components, and $\Sigma Bi(I)$ is the total of blue components. Each pixel value of the material image is expressed using these R, G, and B average values (Rs_av(I), Gs_av(I), Bs_av(I)). Note that "_av" indicates the average value of pixels of a material image on the source side. Also, p and q are the numbers of horizontal and vertical pixels of the I-th image.

The flow advances to step S351 to calculate parameters that indicate the distribution of the average pixel values of P material images 203. The seventh embodiment describes modes as parameters indicating the distribution of the average pixel values for the sake of simplicity. In this embodiment, modes are used as parameters indicating the distribution of the average pixel values. Alternatively, an average or median may be used. Also, any other methods may be used as long as a concentrated point of average pixel values can be calculated.

More specifically, parameters (Rs_avf, Gs_avf, Bs_avf) as modes are calculated from the average pixel values (Rs_av(I), Gs_av(I), Bs_av(I)) ($0 \leq I \leq P$) of the I-th material image. The values of these parameters Rs_avf, Gs_avf, and Bs_avf are the modes of the pixel values (Rs_av(I), Gs_av(I), Bs_av(I)) ($0 \leq I \leq P$) of the I-th material image.

The flow then advances to step S352, and an original image 201 is segmented into M×N areas. As a result, M×N rectangular areas (tile areas) TL(0, 0), TL(1, 0), TL(2, 0), . . . , TL(3, 3), and TL(3, 4) are generated (when M=4, N=5). This segmentation example is the same as that in FIG. 6 described in the above embodiments.

Each of the areas obtained by segmenting the image 201 has the color configuration shown in FIG. 7, i.e., is composed of p×q pixels of three primary colors, i.e., red (R), green (G), and blue (B) pixels.

The flow advances to step S353, and average values (average pixel values) of each of the M×N areas segmented in step S302 are calculated. For the sake of simplicity, in this embodiment, R, G, and B average density values are calculated as the average pixel values using equations below. If (Ri(m,n), Gi(m,n), Bi(m,n)) represent the pixel values of the i-th pixel in the (m,n)-th area ($0 \leq m < M$, $0 \leq n < N$) of the (M×N) areas, the average pixel values of the (m,n)-th area are given by:

$$Rd\_av(m,n) = \Sigma Ri(m,n)/p \times q \tag{14}$$

$$Gd\_av(m,n) = \Sigma Gi(m,n)/p \times q \tag{15}$$

$$Bd\_av(m,n) = \Sigma Bi(m,n)/p \times q \tag{16}$$

where $\Sigma Ri(m,n)$ is the total of pixel values of red components of the (m,n)-th area, $\Sigma Gi(m,n)$ the total of green components, and $\Sigma Bi(m,n)$ the total of blue components. Note that "d_av" indicates the average value of pixels of the image 201 as a destination.

The flow advances to step S354 to calculate parameters indicating the distribution of the average pixel values of the M×N areas. As in step S351, modes are explained as parameters indicating the distribution of the average pixel values. In this embodiment, modes are used as parameters indicating the distribution of the average pixel values. Alternatively, an average or median may be used. Also, any other methods may be used as long as a concentrated point of average pixel values can be calculated.

More specifically, in step S354, parameters (Rd_avf, Gd_avf, Bd_avf) as modes are calculated from the R, G, and B average pixel values (Rd_av(m,n), Gd_av(m,n), Bd_av(m,n)) of the (m,n)-th area of the original image 201. The three values of these parameters Rd_avf, Gd_avf, and Bd_avf are respectively the modes of Rd_av(m,n), Gd_av (m,n), and Bd_av(m,n).

The flow advances to step S355 to determine color conversion parameters on the basis of the R, G, and B distribution parameters (Rs_avf, Gs_avf, Bs_avf) of the material images calculated in step S351 and the R, B, and B parameters (Rd_avf, Gd_avf, Bd_avf) of the original image 201 calculated in step S354.

In this embodiment, these color conversion parameters are calculated by:

$$Rconv = Rs\_avf/Rd\_avf \tag{17}$$

$$Gconv = Gs\_avf/Gd\_avf \tag{18}$$

$$Bconv = Bs\_avf/Bd\_avf \tag{19}$$

The flow advances to step S356 to color-convert the average pixel values of the respective areas of the original image calculated in step S353 using the color conversion parameters calculated based on the average pixel values of the respective areas in step S355. That is, color conversion is done by:

$$Rd\_av(m,n)' = Rconv \times Rd\_av(m,n) \quad (20)$$

$$Gd\_av(m,n)' = Gconv \times Gd\_av(m,n) \quad (21)$$

$$Bd\_av(m,n)' = Bconv \times Bd\_av(m,n) \quad (22)$$

As a result of this color conversion, the distribution of the pixel values of the respective areas of the original image 201 is brought close to that of the average pixel values of the material images 203. Consequently, it is expected that an evaluation value (ΔE) used upon selecting a material image can be reduced.

The flow advances to step S357 to reset counters Xpos (0≦Xpos≦M−1) and Y-Pos (0≦Ypos≦N−1) indicating the position of the area to be processed of the original image 201 to zero. Note that (Xpos, Ypos)=(0, 0) indicates the upper left end area (TL(0, 0) in FIG. 6) of the original image 201.

The flow advances to step S358, and an image most suitable for the area indicated by the position counters Xpos and Ypos is selected from the material images 203.

In this selection method, a distance ΔE of R, G, and B tristimulus values between the area of interest and each material image is calculated, and a material image with the smallest ΔE is selected. This evaluation formula is given below. That is, a distance ΔE(m,n) between the (m,n)-th area and material image is given by:

$$\Delta E(m,n) = SQRT [(Rs\_av - Rd\_av(m,n)')^2 + (Gs\_av - Gd\_av(m,n)')^2 + (Bs\_av - Bd\_av(m,n)')^2] \quad (23)$$

where "SQRT" means the square root.

Upon pasting the image selected based on this evaluation formula on an area of the image 202, if their sizes do not match, the image is enlarged/reduced to an appropriate size.

These processes are sequentially done for horizontal and vertical areas of the image 201 until all the areas of the image 201 are processed (S359, S360).

As described above, according to the embodiment of the present invention, the color of the entire original image 201 can be converted into that suitable for material images. In this way, even when material images having a color distribution suitable for that of a design or picture image of the original image 201 are not available, since the color distribution of the original image can be brought close to that of material images, the colors of the respective tile areas in a mosaic image can be prevented from being quite different from those of the corresponding areas of the original image.

As described above, although the color of the entire original image is converted into that suitable for material images to make the color distribution of the original image close to those of material images, it is possible to apply for making the color distribution of the material images close to those of original image.

Eighth Embodiment

In this embodiment, the color of the entire original image 201 is converted into that suitable for material images using L*a*b* component values indicating colors of individual pixels. Only different processes from the seventh embodiment described above will be explained below.

The seventh embodiment described above uses R, G, and B values as pixel values, but may also use a colorimeteric system that takes visual sense characteristics of human being into consideration, e.g., L*a*b* values.

In this case, in the seventh embodiment, ratio calculations are made so that the pixel values of each area of the original image 201 become nearly equal to the modes of the R, G, and B stimulus values of the average pixel values of each material image 203. In the eighth embodiment, a material image is selected so that the distribution of the average pixel values of each area of the original image 201 in an L*a*b* space matches that of the average values of a material image in the L*a*b* space.

In this selection, since L* is a value corresponding to the luminance of the pixel of interest, a person does not recognize any color tone difference. Hence, the average pixel values of each area of the original image 201 are rotated about the origin of an a*b* plane so that the distribution of the average pixel values of each area of the original image 201 nearly matches that of the average pixel value of each material image 203 on the a*b* plane.

This process will be explained below with reference to the flow chart in FIG. 16.

In step S350, the average pixel values of P material images are calculated. In this case, the average values of the material image of interest are calculated in the L*a*b* calorimetric system. In general, image data is expressed by three data (R, G, B) in an RGB colorimetric system. In such case, the image data can be converted into L*a*b* data using a conversion formula below.

Assuming that R, G, and B values are normalized to 0≦R, G, B≦1, X, Y, and Z values are calculated by:

$$\begin{pmatrix} X \\ Y \\ Z \end{pmatrix} = \begin{pmatrix} 0.6067 & 0.1736 & 0.2001 \\ 0.2988 & 0.5868 & 0.1144 \\ 0 & 0.0661 & 1.1150 \end{pmatrix} \begin{pmatrix} R \\ G \\ B \end{pmatrix} \quad (24)$$

then L*, a*, and b* values are calculated by:

$$L^* = 116\{(Y/YO)^{1/3}\} - 16 \quad (25)$$

$$a^* = 500[\{(X/XO)^{1/3}\} - \{(Y/YO)^{1/3}\}] \quad (26)$$

$$b^* = 200[\{(Y/YO)^{1/3}\} - \{(Z/ZO)^{1/3}\}] \quad (27)$$

where XO, YO, and ZO are values determined by the light source. For example, when the light source is 6,500K, XO=0.95045, YO=1.0, and ZO=1.08892.

In this embodiment, in step S350, L*, a*, and b* average values are calculated as the average pixel values of each material image using, e.g., equations below.

If (L*i(I), A*i(I), B*i(I)) represent the pixel values of the i-th pixel of the I-th material image (0≦I<P) of P material images 203, the average value of the I-th material image are calculated by:

$$L^*s\_av(I) = \Sigma L^*i(I)/p \times q \quad (28)$$

$$A^*s\_av(I) = \Sigma A^*i(I)/p \times q \quad (29)$$

$$B^*s\_av(I) = \Sigma B^*i(I)/p \times q \quad (30)$$

In step S351, parameters that indicate the distribution of the average pixel values of the P material images 203 are calculated. In the L*a*b* colorimetric system, since L* indicates the brightness of each pixel and does not pertain to the color tone of the pixel, only a* and b* are used in parameter calculations. Hence, the average L*s_av(I) of L* is calculated in the above description for the sake of convenience, but need not be calculated since it is not used in the following example.

The eighth embodiment describes modes as parameters indicating the distribution of the average pixel values for the sake of simplicity. In this embodiment, modes are used as parameters indicating the distribution of the average pixel values. Alternatively, an average or median may be used. Also, any other methods may be used as long as a concentrated point of average pixel values can be calculated.

More specifically, in step S351, color tone distribution parameters (As_avf, Bs_avf) of a material image are calculated as modes on the basis of values (A*s_av(I), B*s_av(I)) required for expressing the color tone of the average pixel values. These two values As_avf and Bs_avf are respectively the modes of As_av(I) and Bs_av(I).

The flow advances to step S353, the average pixel values of the M×N areas segmented in step S352 are calculated. In this case, L*, a*, and b* average values are calculated using equations below as the average pixel values. If (L*i(m,n), A*i(m,n), B*i(m,n)) represent the pixel values of the i-th pixel of the (m,n)-th area (0≦m<M, 0≦n<N) in the (M×N) areas obtained by segmenting the original image 201, the average pixel values of the (m,n)-th area are given by:

$$L*d\_av(m,n) = \Sigma L*i(m,n)/p \times q \quad (31)$$

$$A*d\_av(m,n) = \Sigma A*i(m,n)/p \times q \quad (32)$$

$$B*d\_av(m,n) = \Sigma B*i(m,n)/p \times q \quad (33)$$

The flow then advances to step S354 to calculate parameters indicating the distribution of the average pixel values of the M×N areas. As in calculations of the distribution parameters of the average pixel values of a material image in step S351, the a* and b* modes are calculated as parameters that indicate the distribution of the average pixel values. This embodiment uses modes as the parameters indicating the distribution of the average pixel values. Alternatively, an average or median may be used. Also, any other methods may be used as long as a concentrated point of average pixel values can be calculated.

In this case, parameters (A*d_avf, B*d_avf) are calculated as modes on the basis of (A*d_av(m,n), B*d_av(m,n)) as the average pixel value parameters of the respective areas. These two values, A*d_avf and B*d_avf, are respectively the modes of A*d_av(m,n) and B*d_av(m,n).

The flow advances to step S355 to determine color conversion parameters on the basis of the A*s_avf, B*s_avf, A*d_avf, and B*d_avf. Note that "d_av" and "s_av" respectively indicate the average pixel values of a material image and an area obtained by segmenting the original image.

In this case, since A*s_avf and B*s_avf are converted to nearly match values A*d_avf' and B*d_avf' obtained by converting A*d_avf and B*d_avf, if a color conversion parameter C is given by:

$$C = \begin{bmatrix} a & b \\ c & d \end{bmatrix} \quad (34)$$

then we have:

$$\begin{bmatrix} A*s\_avf \\ B*s\_avf \end{bmatrix} = \begin{bmatrix} A*d\_avf' \\ D*d\_avf' \end{bmatrix} = \begin{bmatrix} a \times A*d\_avf + b \times B*d\_avf \\ c \times A*d\_avf + d \times B*d\_avf \end{bmatrix} = \begin{bmatrix} \cos\theta \times A*d\_avf - \sin\theta \times B*d\_avf \\ \sin\theta \times A*d\_avf + \cos\theta \times B*d\_avf \end{bmatrix} \quad (35)$$

where θ is the angle formed by vectors (A*s_avf, B*s_avf) and (A*d_avf, B*d_avf) make with each other on the a*b* plane.

Since cosθ and sinθ used in this equation can be easily calculated from the vectors (A*s_avf, B*s_avf) and (A*d_avf, B*d_avf), the conversion matrix C can be determined from the vectors (A*s_avf, B*s_avf) and (A*d_avf, B*d_avf).

The flow advances to step S356 to color-convert the a* and b* components of L*d_av(m,n), A*d_av(m,n), and B*d_av(m,n) of the average pixel values of the respective areas calculated in step S355 using the color distribution parameters of the material images calculated in step S301 and the color conversion parameter matrix C:

$$A*d\_av(m,n) = a \times A*d\_av(m,n) + b \times B*d\_av(m,n) \quad (36)$$

$$B*d\_av(m,n) = c \times A*d\_av(m,n) + d \times B*d\_av(m,n) \quad (37)$$

With this color conversion, the distribution state of the pixel values of each area of the original image 201 becomes close to the distribution of the average pixel values of each material image. As a result, the evaluation value (ΔE) indicating the distance (difference) between the colors of each area and material image, which is used upon selecting a material image, can be reduced.

As described above, according to this embodiment, the entire original image 201 can be color-converted to a color suitable for material images using a* and b* components indicating the colors of pixels.

Even when no material images suitable for the distribution of colors of a design or picture image of the original image 201 is available, since the color distribution of that original image can be brought close to that of material images, the colors of the respective tile areas in a mosaic image can be prevented from being quite different from those of the corresponding areas of the original image.

As described above, according to the embodiment of the present invention, the entire original image can be color-converted to prevent the color of a given area of a generated mosaic image from becoming different from the color of the corresponding area of the original image, thus obtaining a satisfactory mosaic image.

According to the embodiment of the present invention, since color conversion is done to make the color of each tile area of the original image close to that of the material image, any color tone difference between the original image and mosaic image can be eliminated.

According to the embodiment of the present invention, a mosaic image which has a small color tone difference from the original image can be generated even when a limited number of material images are used.

Ninth Embodiment

In this embodiment, the number of tile images is increased by extracting more than one partial images (derivative tile images) from each tile image as a building element, thereby improving the image quality of a mosaic image.

This embodiment pertains to the material image number increase process in step S2 and mosaic image generation process in step S4 in FIG. 4 that shows the outline of the image generation flow. The hardware arrangement of this embodiment is common to that shown in FIG. 1. The process for increasing the number of material images (corresponding to step S2 in FIG. 4) will be explained below.

FIG. 17 shows image extraction templates used in the tile image number increase process. By extracting images from an original image (original tile image) using four templates shown in FIG. 17, four images are generated from a single image. More specifically, image extraction is made on the basis of P tile images (T1, T2, . . . , TP) stored in the file system. In this way, tile images T'1 to T'4 are extracted from the tile image T1 using templates 1 to 4, tile images T'5 to T'8 from the tile image T2, . . . . This process repeats itself for all "i"s (for $1 \leq i \leq P$), thereby increasing the number of tile images from P to 4×P.

Figure 18:
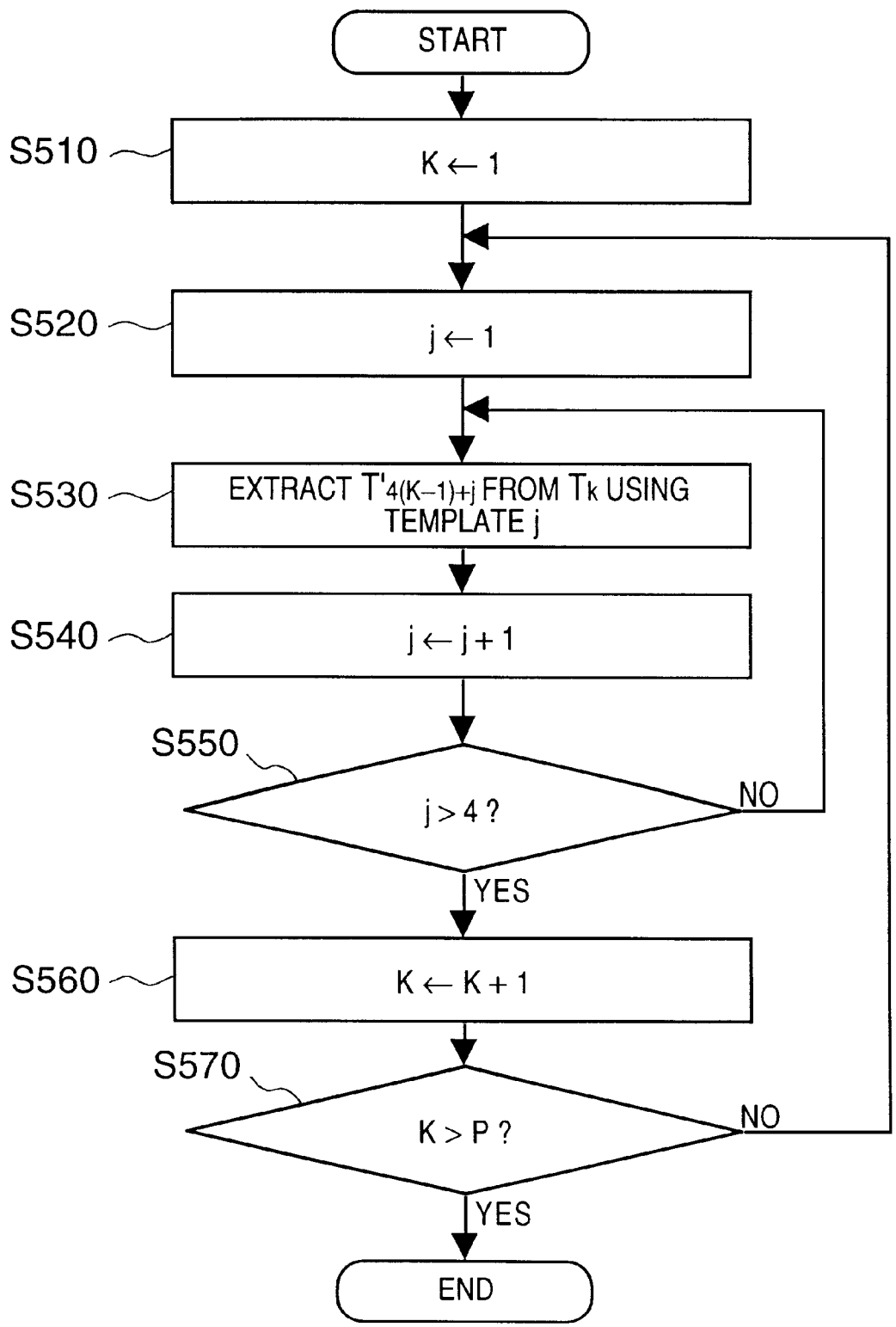
FIG. 18 is a flow chart for explaining the sequence of a material image number increase process according to the ninth embodiment of the present invention.

The image number increase process (corresponding to step S2 in FIG. 4) will be described in detail below with reference to the flow chart shown in FIG. 18. FIG. 18 is a flow chart showing the sequence of the image number increase process according to this embodiment.

In step S510, a value "1" is substituted in variable k. In step S520, a value "1" is substituted in variable j. Variable k designates each of P original tile images, and is incremented by 1 from 1 to P. Also, variable j designates a template used for extracting a new tile image from one original tile image, and assumes a value ranging from 1 to 4 (corresponding to templates 1 to 4; see FIG. 17) in this embodiment.

In step S530, a partial image is extracted from a tile image Tk in correspondence with template j to obtain a derivative tile image T'4(k−1)+j. In step S540, variable j is incremented. If it is determined in step S550 that j>4, the flow advances to step S560; otherwise, the flow returns to step S530. With these processes in steps S530 to S550, four derivative tile images are obtained from each original tile image Tk.

After the four derivative tile images are obtained from the original tile image, the flow advances to step S560 to increment variable k so as to acquire the next original tile image. If it is determined in step S570 that k>P, the processing ends; otherwise, the flow returns to step S520.

By increasing the number of tile images in this way, more appropriate material images can be selected in the subsequent mosaic image generation process S4 (FIG. 4), thus improving the image quality of a mosaic image.

In the mosaic image generation process (corresponding to step S4 in FIG. 4), the R, G, and B average density values of each of segmented areas are calculated using equations (1) to (6), and correlation between the original image and segmented image is evaluated by the function given by equation (7). A material image with the smallest result of the function is selected from the P material images and is pasted, as in the embodiment described earlier.

In this embodiment, four templates are used for the sake of simplicity. The number of templates is not limited to four, and more templates may be used. Also, the image extraction position need not be fixed, and the template shape may be randomly changed.

As described above, according to this embodiment, by extracting more than one partial images (derivative tile images) from each tile image as a building element, the number of tile images can be increased, thereby improving the image quality of a mosaic image.

10th Embodiment

The image quality may be further improved by generating a mosaic image not only from 4×P derivative tile images T'1, . . . , T'4P, but also from a total of 5×P tile images by combining the derivative tile images and P original tile images T1, . . . , TP.

In this case, the mosaic image generation process (corresponding to S4 in FIG. 4) requires a group of tile images having a uniform shape, but a group of original tile images T (T1, . . . , TP) have a size different from that of a group of derivative tile images T' (T1, . . . , T'4P). As described above, since the group of tile images T' are obtained by extracting partial images from the group of tile images T, they have a size smaller than that of the group of tile images T. Hence, the group of tile images T are reduced to a size equal to that of the images T' to generate a group of tile images T" (T"1, . . . , T"P). The groups of tile images T' and T" are combined, and are used as material images, thus generating a mosaic image.

As the image reduction process of the group of tile images T, nearest neighbor, bicubic, or the like may be used. Since these methods are known to those who are skilled in the art, a detailed description thereof will be omitted. Also, the group of tile images T' may be enlarged in place of reducing the group of tile images T.

11th Embodiment

The group of tile images T' extracted in the ninth and 10th embodiments include inappropriate ones as a single image. For example, in case of a portrait image of a person, an image that contains only half the face of a person is inappropriate and is preferably excluded.

More specifically, the operator checks if the extracted tile image is appropriate, between steps S530 and S540 in the flow chart in FIG. 18. For this purpose, the extracted tile image is displayed on the display 103, and when the operator makes a designation input indicating that the displayed image is inappropriate using the keyboard 102 or mouse 102a, the tile image is excluded.

Of course, whether or not an object is unexpectedly divided may be automatically checked by an object recognition technique. Also, automatic and manual recognition techniques may be combined, and only an object which is hard to automatically recognize may be checked by the operator.

As described above, according to this embodiment, upon extraction, an object in a tile image is recognized, and the tile image is extracted not to divide the object. In this way, the number of tile images can be increased without any drop of image quality of each tile image, and the image quality of a mosaic image can be improved.

12th Embodiment

In the above embodiment, when the group of tile images T' obtained by extracting partial images from P original tile images T, which are prepared in advance, are used, if those tile images T' are stored as image data, the requires memory size increases. In this embodiment, an arrangement that can suppress an increase in memory size will be explained.

FIG. 19 is a table for explaining the data holding format that pertains to a group of tile images T' in this embodiment. As has been described above with reference to FIG. 17, four new tile images are generated from each original tile image using extraction templates 1 to 4. The feature amounts of the four generated tile images are calculated, and are stored in correspondence with an original tile image ID (the original tile image is stored as image data) and extraction templates used. Such table can be generated in, e.g., step S530 in FIG. 18. More specifically, if a tile image is derived in step S530, the feature amount of that tile image is calculated, and is registered in the table shown in FIG. 19. The derived tile image need not be stored as image data.

In the mosaic image generation process S4, when a tile image to be used is selected by comparing the feature amounts, since the original tile image ID and template to be used can be obtained from the table which is generated as described above, image data of the tile image to be used can be obtained using them.

As described above, according to this embodiment, since derivative tile images can be managed based on the feature amounts, original tile image IDs, and templates to be used, the memory size can be reduced.

In the ninth to 11th embodiments, P' tile images are generated by extracting partial images from P original tile images. However, the method of deriving a new tile image is not limited to such specific method. For example, partial images extracted from a plurality of original images may be combined to obtain a new tile image. In this case, upon applying the method of this embodiment, each derivative tile image can be registered on the basis of original tile images used and their combination method.

As described above, according to the present invention, since the number of tile images that form a mosaic image can be increased, the image quality of a mosaic image can be improved.

Other Embodiments

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading put and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 20:
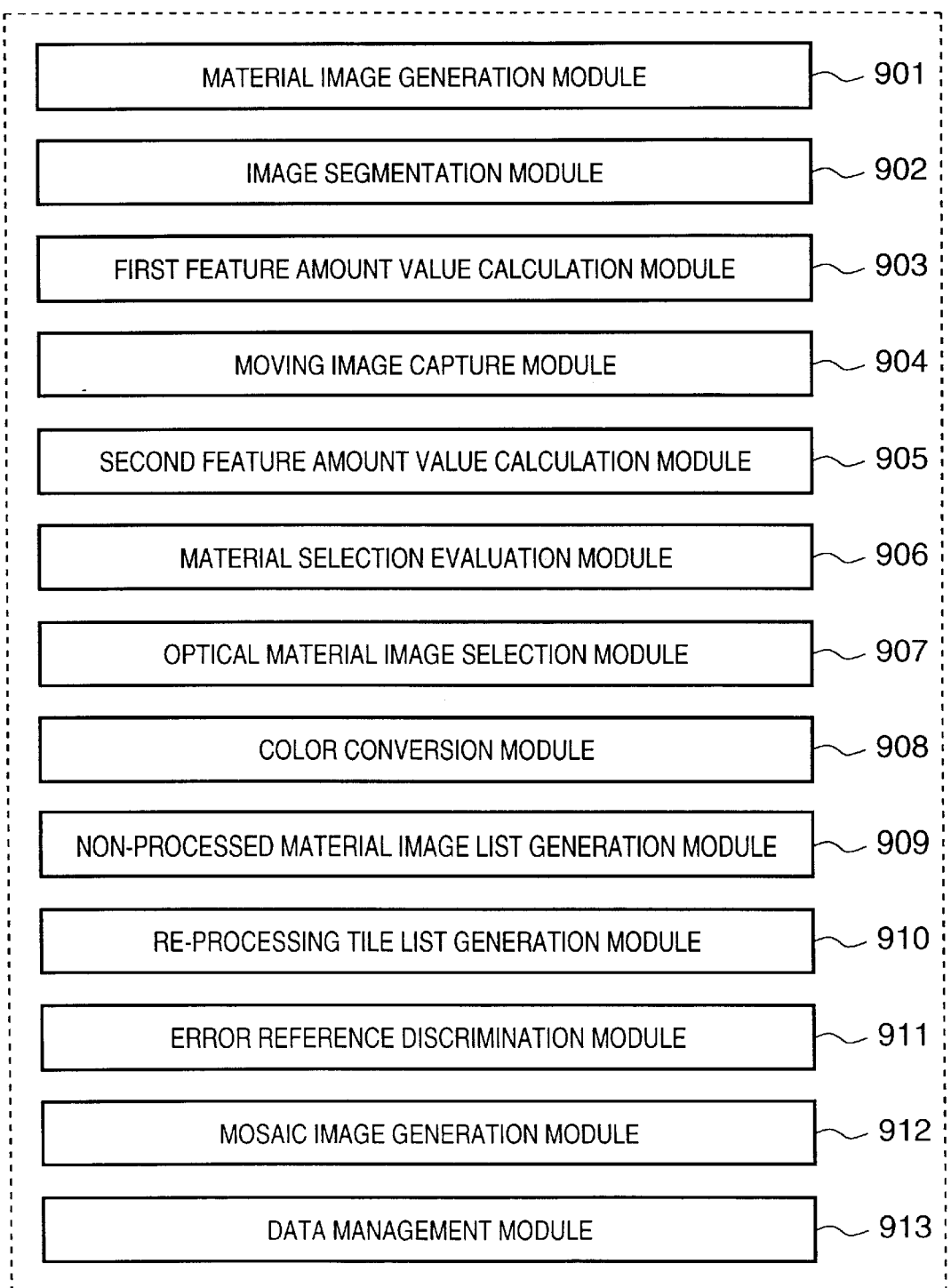
FIG. 20 shows the memory map of a storage medium.

When the present invention is applied to such storage medium, the storage medium stores program codes corresponding to the aforementioned flow charts, i.e., stores modules shown in a memory map example shown in FIG. 20. More specifically, the storage medium can store program codes of at least a "material image generation module 901", "image segmentation module 902", "first feature amount calculation module 903", "moving image capture module 904", "second feature amount calculation module 905", "material selection evaluation module 906", "optimal mate-rial image selection module 907", "color conversion module 908", "non-processed material image list generation module 909", "re-processing tile list generation module 910", "error reference discrimination module 911", "mosaic image generation module 912", and "data management module 913".

The present invention is not limited to the above embodiments and various changes and modifications can be made within the spirit and scope of the present invention. Therefore, to appraise the public of the scope of the present invention, the following claims are made.

What is claimed is:

1. An image processing apparatus for generating a mosaic image by combining a plurality of material images in a mosaic pattern, said apparatus comprising:

division means for dividing an original image into a plurality of areas;

calculation means for calculating an average pixel value of each of the plurality of areas divided by said division means:

storage means for storing the plurality of material images together;

material image generation means for generating another material image on the basis of a material image stored in said storage means;

selection means for comparing the average pixel value calculated by said calculation means with the average pixel value of each of the plurality of another material images generated by said material image generation means and stored in said storage means, and selecting a material image for each area, having an average pixel value which is closest to that of each of the plurality of areas; and mosaic image generation means for generating a mosaic image in which the another material images selected by said selection means are substituted for the plurality of areas.

2. The apparatus according to claim 1, wherein said material image generation means generates a material image by horizontally flipping a first material image.

3. The apparatus according to claim 1, wherein said material image generation means generates a material image having pixels obtained by converting color values of pixels of a first material image.

4. The apparatus according to claim 1, wherein said material image generation means generates a material image by negative/positive-converting a first material image.

5. The apparatus according to claim 1, wherein said material image generation means generates a material image having pixels obtained by converting specific color values of pixels of a first material image.

6. An image processing method for generating a mosaic image by combining a plurality of material images in a mosaic pattern, comprising:

a division step, of dividing a original image into a plurality of areas;

a calculation step, of calculating an average pixel value of each of the plurality of areas divided in said division step;

a storage step, of storing the plurality of material images together;

a material image generation step, of generating another material image on the basis of each of the plurality of stored material images;

a selection step, of comparing the average pixel value calculated in said calculation step with the average pixel value of each of the plurality of another material images generated in said material image generation step and stored in memory means, and selecting a material image for each area, having an average pixel value which is closest to that of each of the plurality of areas; and a mosaic image generation step, of generating a mosaic image in which the another material images selected in said selection step are substituted for the plurality of areas.

7. The method according to claim 6, wherein the material image generation step includes the step of generating a material image by horizontally flipping a first material image.

8. The method according to claim 6, wherein the material image generation step includes the step of generating a material image having pixels obtained by converting color values of pixels of a first material image.

9. The method according to claim 6, wherein the material image generation step includes the step of generating a material image by negative/positive-converting a first material image.

10. The method according to claim 6, wherein the material image generation step includes the step of generating a material image having pixels obtained by converting specific color values of pixels of a first material image.

11. A computer-readable storage medium, which stores a program for implementing an image processing method for generating a mosaic image by combining a plurality of material images in a mosaic pattern, said program comprising:

code for a division step, of dividing an original image into a plurality of areas;

code for a calculation step, of calculating an average pixel value of each of the plurality of areas divided in said division step;

code for a storage step, of storing the plurality of material images together;

code for a material image generation step, of generating another material image on the basis of each of the plurality of stored material images;

code for a selection step, of comparing the average pixel value calculated in said calculation step with the average pixel value of each of the plurality of another material images generated in said material image generation step and stored in memory means and selecting a material image for each area, having an average pixel value which is closest to that of each of the plurality of areas; and code for a mosaic image generation step, of generating a mosaic image in which the plurality of another material images selected in said selection step are substituted for the plurality of areas.

12. The storage medium according to claim 11, wherein said material image generation step includes generating a material image by horizontally flipping a first material image.

13. The storage medium according to claim 11, wherein said material image generation step includes generating a material image having pixels obtained by converting color values of pixels of a first material image.

14. The storage medium according to claim 11, wherein said material image generation step includes generating a material image by negative/positive-converting a first material image.

15. The storage medium according to claim 11, wherein said material image generation step generates a material image having pixels obtained by converting specific color values of pixels of a first material image.

* * * * *

UNITED STATES PATENT AND TRADEMARK OFFICE
CERTIFICATE OF CORRECTION

PATENT NO. : 6,720,971 B1
DATED : April 13, 2004
INVENTOR(S) : Kunihiro Yamamoto et al.

It is certified that error appears in the above-identified patent and that said Letters Patent is hereby corrected as shown below:

Column 8,
Line 34, "a-mosaic" should read -- a mosaic --.

Column 21,
Line 64, "being" should read -- beings --.

Column 24,
Line 24, "is" should read -- are --; and
Line 47, "images" should read -- image --.

Column 26,
Line 49, "requires" should read -- required --.

Column 27,
Line 33, "put" should read -- out --.

Column 28,
Lines 28 and 35, "another" should read -- other --; and
Line 55, "a" (second occurrence) should read -- an --.

Column 29,
Lines 1 and 8, "another" should read -- other --.

Column 30,
Lines 9 and 16, "another" should read -- other --.

Signed and Sealed this

Twenty-seventh Day of September, 2005

JON W. DUDAS
*Director of the United States Patent and Trademark Office*